US012282794B2

(12) United States Patent
Garbett et al.

(10) Patent No.: US 12,282,794 B2
(45) Date of Patent: Apr. 22, 2025

(54) DATA PROCESSING SYSTEMS

(71) Applicant: Arm Limited, Cambridge (GB)

(72) Inventors: David Thomas Garbett, Cambridge (GB); Jussi Tuomas Pennala, Oulu (FI); Henrik Nils-Sture Olsson, Lund (SE); Nicholas John Nelson Murphy, Cambridge (GB)

(73) Assignee: Arm Limited, Cambridge (GB)

( * ) Notice: Subject to any disclaimer, the term of this patent is extended or adjusted under 35 U.S.C. 154(b) by 55 days.

(21) Appl. No.: 18/251,564

(22) PCT Filed: Nov. 4, 2021

(86) PCT No.: PCT/GB2021/052866
§ 371 (c)(1),
(2) Date: May 3, 2023

(87) PCT Pub. No.: WO2022/096890
PCT Pub. Date: May 12, 2022

(65) Prior Publication Data
US 2024/0012673 A1    Jan. 11, 2024

(30) Foreign Application Priority Data
Nov. 4, 2020 (GB) .................................. 2017467

(51) Int. Cl.
*G06F 11/00* (2006.01)
*G06F 9/455* (2018.01)
*G06F 11/07* (2006.01)

(52) U.S. Cl.
CPC ...... *G06F 9/45558* (2013.01); *G06F 11/0721* (2013.01); *G06F 11/0751* (2013.01); *G06F 2009/4557* (2013.01)

(58) Field of Classification Search
CPC ............ G06F 11/0721; G06F 11/0751; G06F 9/45558; G06F 2009/4557
See application file for complete search history.

(56) References Cited

U.S. PATENT DOCUMENTS

| 7,598,958 B1 | 10/2009 | Kelleher |
| 7,619,629 B1 | 11/2009 | Danilak |

(Continued)

FOREIGN PATENT DOCUMENTS

| CN | 102446114 A | 5/2012 |
| CN | 103034524 A | 4/2013 |

(Continued)

OTHER PUBLICATIONS

Chinese Office Action, CN Application No. 201810920853.5, dated Mar. 9, 2023.

(Continued)

*Primary Examiner* — Michael Maskulinski
(74) *Attorney, Agent, or Firm* — Pearl Cohen Zedek Latzer Baratz LLP

(57) ABSTRACT

A data processing system (1) comprises a plurality of processing units (11) and a controller (30) operable to allocate processing units of the plurality of processing units into respective groups of the processing units, wherein each group of processing units comprises a set of one or more of the processing units of the plurality of processing units. The data processing system further comprises an arbiter (31, 32) for each group of processing units for controlling access by virtual machines (33, 34) that require processing operations to the processing units of the group of processing units that the arbiter has been allocated.

20 Claims, 15 Drawing Sheets

(56) References Cited

U.S. PATENT DOCUMENTS

| | | |
|---|---|---|
| 7,633,505 B1 | 12/2009 | Kelleher |
| 7,721,118 B1 | 5/2010 | Tamasi et al. |
| 9,135,189 B2 | 9/2015 | Chakraborty et al. |
| 10,475,147 B2 | 11/2019 | Price et al. |
| 10,628,274 B2 | 4/2020 | Gulati et al. |
| 10,732,982 B2 | 8/2020 | Pennala et al. |
| 2003/0164834 A1 | 9/2003 | Lefebvre |
| 2005/0041031 A1 | 2/2005 | Diard |
| 2006/0267987 A1 | 11/2006 | Litchmanov |
| 2008/0098208 A1 | 4/2008 | Reid et al. |
| 2010/0011370 A1 | 1/2010 | Kubo et al. |
| 2010/0262722 A1* | 10/2010 | Vauthier ............ G06F 9/45558 718/1 |
| 2012/0069032 A1 | 3/2012 | Hansson et al. |
| 2012/0084774 A1 | 4/2012 | Post et al. |
| 2012/0249559 A1 | 10/2012 | Khodorkovsky et al. |
| 2013/0091500 A1 | 4/2013 | Earl et al. |
| 2014/0176583 A1* | 6/2014 | Abiezzi ................ G06F 9/5044 345/522 |
| 2014/0218377 A1 | 8/2014 | Wu |
| 2015/0029200 A1 | 1/2015 | Khosa et al. |
| 2015/0293774 A1 | 10/2015 | Persson et al. |
| 2016/0239333 A1 | 8/2016 | Cowperthwaite et al. |
| 2016/0246629 A1 | 8/2016 | Tisirkin |
| 2017/0024231 A1 | 1/2017 | Riel et al. |
| 2017/0161204 A1 | 6/2017 | Roberts et al. |
| 2018/0077214 A1 | 3/2018 | Fawcett |
| 2018/0293183 A1 | 10/2018 | Cooray et al. |
| 2019/0050309 A1 | 2/2019 | Smith et al. |
| 2019/0056955 A1 | 2/2019 | Pennala |
| 2019/0213032 A1 | 7/2019 | Eyal et al. |

FOREIGN PATENT DOCUMENTS

| | | |
|---|---|---|
| CN | 105830026 A | 8/2016 |
| CN | 107015845 A | 8/2017 |
| GB | 2527822 | 1/2016 |
| GB | 2547252 A | 8/2017 |
| WO | 2014100558 A1 | 6/2014 |

OTHER PUBLICATIONS

Decision of Rejection dated May 27, 2024, Chinese Patent Application No. 201810920853.5, 20 pages.
International Preliminary Report on Patentability dated May 8, 2023, International Application No. PCT/GB2021/052861.
Written Opinion of the International Searching Authority dated May 8, 2023, International Application No. PCT/GB2021/052861.
Search & Examination Report dated Aug. 24, 2021, GB Patent Application No. GB2017451.2.
International Preliminary Report on Patentability dated May 8, 2023, International Application No. PCT/GB2021/052866.
Written Opinion of the International Searching Authority dated May 8, 2023, International Application No. PCT/GB2021/052866.
Search & Examination Report dated Jul. 14, 2021, GB Patent Application No. GB2017467.8.
U.S. Appl. No. 18/251,602, filed May 3, 2023.
GB Combined Search and Examination Report, dated Jul. 21, 2016, GB Patent Application No. GB1602547.0.
Office Action dated Jan. 31, 2024, Chinese Patent Application No. 201810920853.5, 18 pages.

* cited by examiner

Step 1: assign each group to a bus, then add slices, partitions and access windows to each group.

Step 2: assign slices into partitions to make GPUs.

Step 3: enable an access window for each partition to allow a driver access to it.

Step 4: allow different drivers to take turns on partitions by changing the access windows.

DATA PROCESSING SYSTEMS

BACKGROUND

The technology described herein relates to data processing systems and in particular to data processing systems that comprise plural processing units, such as plural graphics processing units (processors) (GPUs).

It is becoming increasingly common for data processing systems to require, e.g. graphics processing operations, for multiple isolated sub-systems. For example, vehicles may have a display screen for the main instrument console, an additional navigation and/or entertainment screen, and an advanced driver assistance system (ADAS). Each of these systems may require their own graphics processing operations to be performed, and it may be necessary, e.g. for formal safety requirements, for them to be able to operate independently of each other.

One approach to such systems would be to provide a single graphics processing unit (GPU) that is time shared between the different graphics processing functions that are required. However, time sharing alone may not be able to provide sufficient independence and isolation between the different sub-systems that may require graphics processing.

Alternatively, a completely separate graphics processing unit could be provided for each graphics processing function that is required. However, this may have negative implications, e.g. in terms of the number of processing components and/or cost required, as it would require the division of resources to be fixed at SoC (system on chip) creation time.

The Applicants believe therefore that there remains scope for improvements to data processing systems where the provision of plural independent data processing functions, such as graphics processing functions for plural different displays, is required.

BRIEF DESCRIPTION OF THE DRAWINGS

Embodiments of the technology described herein will now be described by way of example only and with reference to the accompanying drawings, in which.

Like reference numerals are used for like components where appropriate in the drawings.

DETAILED DESCRIPTION

Figure 1:
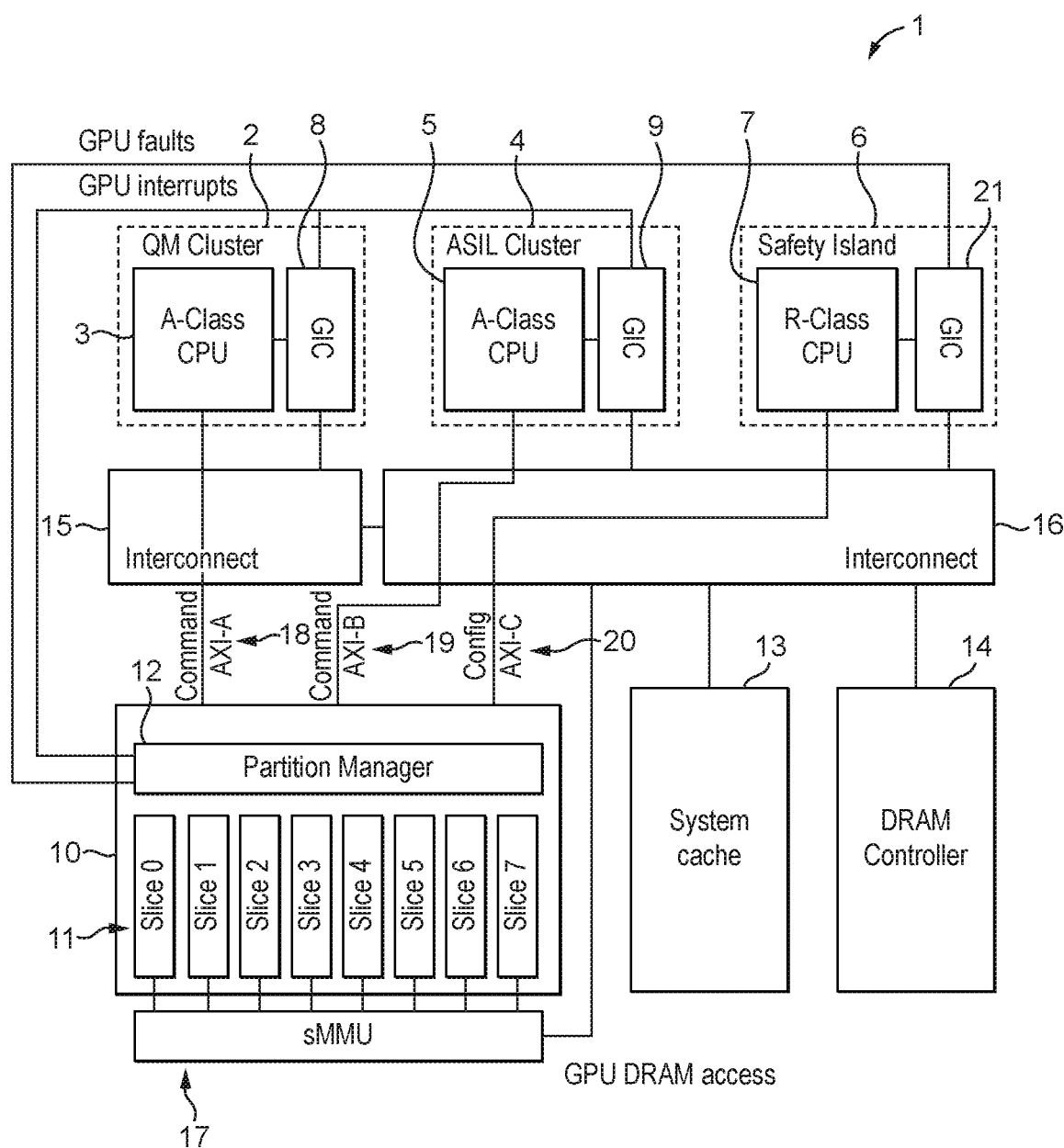
FIG. 1 shows schematically a data processing system according to an embodiment of the technology described herein.

A first embodiment of the technology described herein comprises a data processing system comprising:
a plurality of processing units;
a controller operable to allocate processing units of the plurality of processing units into respective groups of the processing units, wherein each group of processing units comprises a set of one or more of the processing units of the plurality of processing units;
the data processing system further comprising:
a plurality of arbiters, each arbiter being operable to control access by virtual machines that require processing operations to the processing units of a group of processing units that the arbiter has been allocated;
wherein
the arbiter for a group of the processing units is only able to allow a virtual machine to access processing units from within the group of processing units that it has been allocated.

A second embodiment of the technology described herein comprises a method of operating a data processing system, the data processing system comprising a plurality of processing units;
the method comprising:
a controller allocating processing units of the plurality of processing units into respective groups of the processing units, wherein each group of processing units comprises a set of one or more of the processing units of the plurality of processing units;
and, for each group of processing units:
an arbiter associated with that group of processing units controlling access by a virtual machine or machines that requires processing operations to processing units from and solely from the group of processing units.

The technology described herein relates to a data processing system that includes plural processing units (e.g. graphics processing units). The plural processing units are allocated to (arranged into) respective groups of one or more processing units. Each group of processing units then has an (its own) associated arbiter that is operable to allocate processing units of the group in question to virtual machines that require processing operations by a processing unit.

As will be discussed further below, this can then provide a data processing system for carrying out processing tasks for virtual machines in which the processing units can be allocated and organised for use by virtual machines in a flexible and adaptable manner. For example, rather than fixing the distribution of the processing units into different groups at the time when the system is fabricated, the controller is able to configure the allocation of processing units into different groups as desired, and, e.g., and in an embodiment, to vary that allocation in use. For example, it is possible to flexibly and adaptably distribute the processing units of the system between a, e.g. "safety critical" domain and a non-safety critical domain, e.g. depending upon the intended use and application of the processing units.

Correspondingly, having an arbiter for each group that is operable to allocate access to processing units of the group to respective virtual machines means that processing units can be allocated to virtual machines in use in a flexible and adaptable manner.

Furthermore, organising the processing units of the data processing system into respective, separate, groups of the processing units, and having a separate arbiter associated with each respective group of the processing units, facilitates separating, e.g. safety critical, operations, from, e.g. non-safety critical, operations in an effective and efficient manner, and ensuring that, e.g., safety critical operations can be appropriately protected. For example, one group of processing units may be assigned to and operate in a "safety critical" domain, with another group or groups of the processing units being assigned to and operating in a non-safety critical domain (and in one embodiment that is the case).

The technology described herein can thus support hardware separation between, e.g. safety and non-safety critical domains, without limiting the flexibility of the system and its ability to support different configurations of the processing units as between the domains (and for those configurations to be varied and variable).

Correspondingly, the technology described herein can allow and ensure the separation of "safe" from "non-safe" code, and can avoid the need to ensure that all of the control for allocating processing units to virtual machines in the system is appropriate for safety critical applications (and operates in a safety critical manner accordingly), since, for example, it can be ensured that any "safety critical" applications and virtual machines are allocated to a group of processing units having a corresponding arbiter that is configured and operable to support safety critical operation, whilst other, e.g. non-safety critical applications and virtual machines can be allocated to a group of processing units and corresponding arbiter that does not have to be, and in an embodiment is not, configured and operable to support safety critical operations.

This all then means that the data processing system of the technology described herein can provide a system in which a "pool" of processing units can be flexibly and adaptably allocated both between, e.g., safety critical and non-safety critical domains, and to virtual machines to provide processing functions for those virtual machines, whilst supporting, e.g., and in an embodiment, both safety critical and non-safety critical operations, and in an efficient manner.

The data processing system may comprise any desired and suitable plural number of processing units. In an embodiment, there are four or eight processing units, but the data processing system may comprise more or fewer processing units, as desired.

The processing units may be any suitable and desired form of processing units. In an embodiment, they are processing units that are intended to perform particular forms of processing operation, and in particular that, in an embodiment, function as hardware accelerators for a particular form or forms of processing operation. Thus the processing units may, for example, be, as discussed above, graphics processing units (graphics processors), but they may also, e.g., be other forms of processing unit and accelerator, such as video processing units, machine learning accelerators, neural network processing units, etc.

Each processing unit of the system (that is operated in the manner of the technology described herein) should perform (accelerate) the same type of processing (thus the processing units will all be graphics processing units, or will all be video processing units, or will all be machine learning accelerators, etc.).

In an embodiment the processing units are (all) graphics processing units. In this case, the graphics processing units of the data processing system can comprise any suitable and desired form of graphics processing units (graphics processors (GPUs)). They may perform any suitable and desired form of graphics processing, such as rasterisation-based rendering, ray-tracing, hybrid ray-tracing etc.

This being the case, the technology described herein will be described below primarily with reference to the processing units being graphics processing units (and, correspondingly, to the performing of graphics processing operations for virtual machines). However, unless the context requires otherwise, the described features of the technology described herein can equally and analogously be applied to and used for other forms of processing unit, and the technology described herein extends to such systems using forms of processing unit other than graphics processing units.

All the processing units of the system may be the same as each other (e.g., and in an embodiment, in terms of their resources and/or processing capabilities, etc.), or one or more of the processing units of the system may differ from each other, as desired.

In an embodiment, some or all, and in an embodiment all, of the processing units are operable to act as (and can act as) a standalone processing unit.

In embodiments, at least one of (and in an embodiment some but not all of) the processing units may also or instead be operable to act as a primary (master) processing unit and control the processing operations of another one or ones of the processing units. Similarly, at least one of (and in an embodiment some but not all of) the processing units in an embodiment may also or instead be operable to act as a secondary (slave) processing unit to perform processing operations under the control of a primary (master) processing unit of the processing units.

To facilitate this, some (and in an embodiment each) of the processing units of the plurality of processing units are (e.g. selectively) connectable to at least one other processing unit of the plurality of processing units, e.g. and in an embodiment via a communications bridge, to allow communication between the connected or "linked" processing units.

Thus, in an embodiment, the data processing system includes plural processing units, some or all of which that can be operated independently, as standalone processing units, but with some or all of the processing units also being able to be operated in a combined manner, as a "linked" set of the processing units (in an embodiment with one of the processing units in the "linked" set (that thereby acts as primary, "master" processing unit) controlling operations of other one(s) of the processing units of the "linked" set (that thereby act as secondary, "slave" processing unit(s)).

Thus, in an embodiment, at least some of the processing units are able to be operated as standalone processing units, and at least some of the processing units are able to be operated in combination with others of the processing units, to thereby provide a combined (linked) set of processing units that can together be allocated to a virtual machine (and that will, e.g., and in an embodiment, be seen as a "single" processing unit from the perspective of the virtual machine).

In an embodiment all of the processing units of the system can both operate as standalone processing units and in combination with other processing units of the system, but it would also be possible for, e.g., only some of the processing units to be able to operate as standalone processing units (e.g. such that some processing units can only operate in combination with other processing units (e.g. as a slave processing unit)). Correspondingly, it could be the case that only some but not all of the processing units are able to operate in combination with other processing units.

The processing units (in the "pool" of processing units) can be allocated to respective groups of processing units in any suitable and desired arrangement and distribution. The processing units should be and are in an embodiment arranged as plural (separate) groups of processing units. In one embodiment, there are two groups of processing units, but it would be possible to have more than two groups of processing units, if desired.

Each group of processing units can contain any suitable and desired number of processing units. The groups could each contain the same number of processing units, but that is not essential, and different groups may contain different numbers of processing units, as desired. For example, one group could contain a single processing unit, with another group containing plural processing units.

The distribution of the available processing units as between different groups of those processing units can be determined and set in any suitable manner. This may, and is in an embodiment, done, for example, based on and in an embodiment to match the processing performance requirements of the system in question. For example, in the case of graphics processing, groups that are intended to handle more complex graphics generation (e.g. for entertainment purposes) may be assigned more graphics processing units to meet the performance needs, while groups handling more simple graphics processing requirements (e.g. for a control panel) may be assigned fewer graphics processing units. An advantage of the technology described herein is that the distribution of processing units to groups in the technology described herein can be done flexibly and can be changed, by software or firmware, in use, depending upon the kind of system and application that the processing units are being used for.

In the case where a group of processing units contains plural processing units then the processing units in the group are in an embodiment operable, as discussed above, both as (one or more) standalone processing units and as (one or more) "combined" arrangements of processing units (in an embodiment in which one processing unit acts as a primary, master processing unit controlling operations of other secondary, "slave" processing unit(s)).

Each group of one or more processing units should, and in an embodiment does, comprise different processing units of the plurality of processing units to all of the other groups of processing units. Thus there should be, and is in an embodiment, no sharing of processing units between the different groups of processing units. Correspondingly, each group of processing units will comprise its own unique and exclusive set of one or more processing units, that does not share any processing units with any of the other groups of processing units that have been assigned.

Thus, in an embodiment, the controller is operable to (e.g. logically) separate the plural processing units into plural (e.g. two) groups, wherein each group comprises one or more of the processing units, and the plural groups are distinct from each other, i.e. each processing unit belongs to only one group.

In an embodiment, the plural groups comprise a first group comprising a first set of one or more of the processing units that may be, and is in an embodiment, reserved for and used by a first set of one or more virtual machines that require a first type of data processing to be carried out, and a second group comprising a second set of one or more of the processing units that may be, and is in an embodiment, reserved for and used by a second set of one or more virtual machines that require a second type of data processing to be carried out. The first type of data processing may be other than (may not comprise) safety critical data processing tasks (such as graphics processing tasks for navigation/entertainment displays, etc.). The second type of data processing may comprise safety critical data processing tasks (such as graphics processing tasks for main instrument console displays, data processing tasks for (e.g. assisting) vehicle control, etc.).

In an embodiment, the allocation of processing units to respective groups of processing units can be changed and varied by the controller (rather than being fixed once the controller has configured an initial allocation of processing units to groups). For example, in an automotive application, when reverse gear is engaged, graphics processing units being used for a navigation and/or entertainment display in a "non-safe" group may be moved to a safe "group" and used to display the reversing camera.

Thus, in an embodiment, the controller is operable to be able to move processing units from one group to another, e.g., and in an embodiment, in response to some event that may be detected and conveyed to the data processing system and the controller.

Allowing the processing units to be moved between groups in use provides even greater flexibility and allows, for example, the overall system to be configured with fewer overall processing resources, whilst still, for example, being able to meet peak performance demands.

In the case where the controller wishes to move a processing unit or units from one group to another (to reconfigure the groups of processing units), there is in an embodiment an appropriate "handshaking" procedure, e.g. with the arbiters and/or virtual machines for the respective groups, to allow any processing units that are being moved between the groups to be appropriately stopped and restarted (once they have moved to a different group), and, for example, any tasks that they were performing to be appropriately suspended. This process in an embodiment also includes resetting and/or powering off (and restarting) the processing units, etc., in question.

The controller that allocates the processing units into respective groups of one or more processing units can take any suitable and desired form. It is in an embodiment an appropriate software controller of the data processing system, e.g. and in an embodiment, that is executing on an appropriate processor, such as a CPU, of the data processing system (and that is separate to the processing units themselves).

The controller in an embodiment comprises appropriately privileged (system control) software (has higher level, e.g. the highest level, privileges, in the system in question), and is configured to and operates in an appropriately secure (protected) manner when assigning processing units to respective groups of the processing units.

Thus, in the case where the system is intended to be used for safety-certified applications, the controller in an embodiment has the appropriate privilege level for the system in question, as it will have control over the rest of the system.

Correspondingly, the control operations of the controller to subdivide the processing units into groups, etc., is (in an embodiment) only permitted to be performed by appropriately privileged software (i.e. by a controller having the appropriate (higher) level of privilege). This may be achieved, for example, by restricting access to the appropriate control settings based on appropriate access privileges (privilege levels).

Correspondingly, the controller is in an embodiment part of (executes on) an appropriately privileged processor or processors (processor cluster) (e.g. CPU) of the system, such as a processor or processors that is part of a "safety island" of the data processing system.

The controller may execute on the same processor as an arbiter and a group of virtual machines (e.g. where the arbiter and virtual machines are correspondingly privileged and executing on a privileged processor).

However, in an embodiment, the controller executes on a different processor to the arbiters and the virtual machines.

The controller in an embodiment executes in isolation (such that more complex execution environments can't affect the assignment, or recovery ability, of the system), and such that the implementation can be verified to work as intended with a high level of confidence.

Similarly, the controller is in an embodiment configured and operable to set the configuration of the processing units into the groups via an appropriately independent (and isolated) communications path, such as an appropriately privileged (protected) communications bus (and which is in an embodiment not accessible to any of the virtual machines that may require processing by the processing units, nor to the arbiters for the groups of processing units).

The controller can operate to allocate the processing units into the respective groups of processing units in any suitable and desired manner.

In an embodiment, the processing units have an associated management circuit that is operable to configure the processing units into different groups under the control of the controller, and the controller correspondingly controls the processing unit management circuit to allocate and configure the processing units into the desired groups of the processing units.

The management circuit can operate to configure the respective groups of processing units in any suitable and desired manner. In an embodiment, it operates to configure a (configurable) communications network that sets the communications paths between the processing units, and to the management circuit and to the arbiters and virtual machines, to set the appropriate communications paths between the processing units and to the arbiters and virtual machines, so as to configure the system to have the desired groups configuration.

The configurable communications network may, for example, comprise a configurable interconnect and/or communications network comprising appropriate switches, and/or for which the address mapping can be configured, etc., such that respective processing units can each independently and selectively be connected to different communication buses and/or to each other, so as to, for example, allow the processing units to be configured into respective groups of processing units that are then connected "together" to a communications bus for that group of processing units.

Thus there is in an embodiment an appropriately configurable communications network, e.g. including one or more configurable interconnects, e.g. together with appropriate switches, that can be configured by the management circuit (under the control of the controller) to set up the desired groups of processing units, and the appropriate communications paths between the respective groups of the processing units and the arbiters (and thus virtual machines) that are to use the groups.

In an embodiment, the controller and/or management circuit are operable and configured to ensure that the processing units allocated to one group of processing units can only be accessed by the arbiter and virtual machines that are allocated to that group of processing units (i.e. such that a (and each) group of processing units cannot be accessed by an arbiter and virtual machines that are intended to use a different group of the processing units). This can help, for example, to ensure that safety critical virtual machines and processing operations are separated from other virtual machines and processing operations. Thus, the processing tasks for a virtual machine can then be carried out by the group of processing units that that virtual machine is allocated to (and substantially in isolation from any other group of processing units and virtual machines).

The controller can control the management circuit to perform the desired configuration of the groups of processing units, etc., in any suitable and desired manner. In an embodiment, the management circuit includes an independent, e.g., and in an embodiment, only accessible by suitably privileged software, configuration interface that is accessible to (and in an embodiment only accessible to) the controller for this purpose. This interface may comprise, for example, a set of configuration registers for setting parameters to control the management circuit to configure the groups of processing units.

Thus, the management circuit in an embodiment comprises a set of configuration registers for configuring and/or controlling the operation of the management circuit to configure the groups of processing units, etc., which configuration registers are accessible to and used by the controller to configure the groups of processing units, etc.

As discussed above, in an embodiment, the controller accesses these configuration registers via a separate (and in an embodiment access-restricted) communications bus, and they are, e.g., and in an embodiment, not accessible to any of the virtual machines that may use the processing units, and, in an embodiment, are not accessible to the arbiters for the groups of processing units.

Thus, in an embodiment, the data processing system comprises a separate, e.g. privileged, processor on which the controller executes (and which is separate and in addition to any processors on which any of the arbiters or virtual machines execute), and which processor has a protected (privilege-restricted) communications path (e.g. bus) to the management circuit (which communications path is not accessible to the arbiters or virtual machines), via which the controller is able to control the management circuit to allocate the processing units, etc., into the respective groups of processing units.

As well as subdividing the processing units into respective groups, in an embodiment, the system is configured such that virtual machines that require processing operations by the processing units can access and address (and be allocated) respective subsets (partitions) of processing units, with each such subset (partition) of processing units being able to be independently (and respectively) allocated to a (different) virtual machine (at any given time).

Thus, in an embodiment, the processing units of a group of processing units are themselves able to be configured as respective "partitions" of processing units within the group, with each partition being able to be independently (and respectively) allocated to a (different) virtual machine (at any given time), and comprising a subset of one or more of the processing units of the group.

In this case, a given partition of processing units may comprise a single processing unit (which in that case will operate as a "standalone" processing unit), or a plurality of combined ("linked") processing units (e.g., and in an embodiment, comprising a master and one or more slave processing units) that collectively operate together to provide processing functions to a virtual machine that is using that partition of the processing units.

In one such embodiment, the controller is operable to (and operates to) set (assign) for a (and in an embodiment for each) group of processing units that it allocates, how many partitions of processing units the group supports (i.e. how many different independently allocatable subsets (partitions) of processing units are permitted for the group in question).

(As will be discussed further below, in embodiments of the technology described herein at least, while the controller is operable to set the number of different subsets (partitions) that a given group of processing units can support, the actual allocation of the processing units of a group to the different subsets (partitions) for the group is done under the control of and performed by the arbiter for the group (and not by the controller).)

Thus, as well as assigning and configuring respective sets of the processing units of the system into respective groups, in an embodiment, the controller is also operable to (and operates to) set (assign) for a (and in an embodiment for each) group of processing units, how many different subsets (partitions) of the processing units can be allocated for the group.

A given group of processing units can be configured to support any suitable and desired number of such independently allocatable subsets (partitions) of the processing units of the group. For example, a group could be configured to support only a single allocatable "subset" of processing units (a single partition) (which will accordingly comprise all of the processing unit(s) that are in the group). Alternatively, a given group of processing units can be configured to support two or more (a plurality of) independently allocatable subsets (partitions) of the processing units in the group.

The controller can allocate and set the number of subsets (partitions) of processing units for a group of processing units in any suitable and desired manner. Again, this is in an embodiment done by the controller controlling an appropriate (the) management circuit for the processing units, e.g., and in an embodiment, that can then set the number of different independently allocatable and addressable subsets (partitions) of the processing units for a group.

In an embodiment, the system (and in an embodiment the management circuit) supports a particular, in an embodiment selected, and in an embodiment fixed, (total) number of partitions (subsets) that the processing units can be divided into, and the controller operates to allocate that number of subsets (partitions) between the different groups of processing units that the controller has allocated. For example, the system may support up to four partitions of the processing units, with the controller correspondingly being operable to distribute those four partitions between the different groups of processing units that it configures. The controller could, e.g., allocate the same number of partitions to each group of processing units, or could allocate different numbers of partitions to the groups of processing units, as desired.

In an embodiment, each group of one or more processing units of the system also has associated with it and allocated to it one or more access "windows", to provide the mechanism by which virtual machines can access and control processing units of the group (when they require processing by processing units of the group).

In an embodiment, these access windows comprise respective sets of addresses (address ranges) which a virtual machine can use to communicate with processing unit(s) of the group. In an embodiment, each access window comprises a range of physical addresses that can be used to access a communications interface, and in an embodiment a set of "communications" registers, to be used to communicate with (and control) processing units of the group in question (which physical addresses will then be mapped into the address space of the (host) processor, e.g. CPU, on which the virtual machine that is to access the group is executing, to allow the virtual machine to address the group of processing units).

Each access window thus in an embodiment corresponds to a "physical" communications interface (and in an embodiment to a set of communications registers) that can be used by a virtual machine to communicate with and control the processing units, and which accordingly has a corresponding set of physical addresses that can be used to access and communicate with that communications interface.

Each access window in an embodiment also comprises and provides an interface (and in an embodiment a (message passing) register or registers) for communications between (for messaging between) a virtual machine and the arbiter for the group in question. This is in an embodiment separate to the processing unit communications interface.

Thus, in an embodiment, the access windows also provide the mechanism whereby a virtual machine may communicate with an arbiter (with the arbiter for the group of processing units that the virtual machine is to use), and in particular provide a mechanism for a virtual machine and arbiter to exchange messages, for example in relation to the virtual machine requesting processing resources, and the arbiter controlling access of the virtual machine to the (partitions of) processing units, for example to signal when the access window is enabled to use a partition, and/or when the virtual machine is to relinquish its use of a partition, e.g. so as to permit a different virtual machine to access the partition.

In an embodiment, these communications interfaces (sets of communications registers) that provide the access windows are part of the management circuit for the processing units. Thus the management circuit for the processing units will provide a set of physical communications interfaces (e.g. sets of communications registers) that can each correspondingly allow access to processing units of the system (and, in an embodiment, also communication between a virtual machine and an arbiter).

In an embodiment a (and each) group of processing units is allocated one or more access windows (e.g., and in an embodiment, address ranges) whereby a virtual machine can access processing units of the group. A group may have a single access window (address range) or plural access windows (address ranges) allocated to it and associated with it. Equally, different groups of processing units can be allocated and associated with different numbers of access windows (address ranges) for accessing the processing units of the group, as desired.

Each "access window" for a group should be, and is in an embodiment, distinctly different from the other access windows allocated to a group (i.e. such that there is no overlap between the access windows allocated to and associated with a group of processing units). Thus, in an embodiment, each access window comprises a distinct, and separate, set (range) of addresses to the other access windows that are associated with a group (there is no sharing of addresses between the different access windows allocated to and associated with a group).

Each access window correspondingly in an embodiment allows access to a different communications interface (a different set of "communications" registers) to the other access windows that are associated with a group.

In an embodiment, all the access windows (irrespective of which group they are allocated to) are distinctly different from each other (i.e. such that there is no overlap between any of the access windows, and each of the access windows accesses a different communications interface (set of registers) to any of the other access windows).

In the embodiment where the processing units of a group are organised into and accessed as respective independently allocatable partitions (subsets) of processing units, then a (and each) access window (e.g. set of addresses) for a group allows access to, and can be used to access, a partition of the processing units.

While it would be possible for there to be a one-to-one mapping between the "access windows" and the allocatable partitions of processing units within a group of processing units, in an embodiment there is no requirement for the number of access windows and the number of independently allocatable partitions of processing units for a group to match.

Thus, there may, for example, be more access windows (address ranges) allocated to a group of processing units than there are independently allocatable partitions of processing units within the group (and in an embodiment, this is the case). In this case therefore, not all the "access windows" will be able to be "active" at the same time, and so, as will be discussed further below, the arbiter for a group is in an embodiment operable to, and operates to, share partitions of independently allocatable processing units within the group between different "access windows", in a time-divided manner.

Correspondingly, while there could be a fixed mapping between an access window for a group and one of the independently allocatable partitions of processing units for that group, in an embodiment, the mapping of access windows to partitions is flexible and can be varied in use, in an embodiment by the arbiter for the group (i.e. such that the (instantaneous) relationship between an access window and a partition of processing units for a group can be, and is, set in use (and in an embodiment by the arbiter for the group (this will be discussed further below)).

The number of access windows and the configuration of each access window (e.g., the address range for each access window) for a (and each) group is in an embodiment set by the controller that configures the respective groups of processing units, and is in an embodiment done when the controller is configuring the groups of processing units. Thus, in an embodiment, the controller operates to allocate processing units of the plurality of processing units of the system to respective groups of the processing units, and to, correspondingly, allocate a set of one or more access windows to each group of processing units that it creates.

The controller can allocate and set the number of access windows for a group of processing units in any suitable and desired manner. Again, this is in an embodiment done by the controller controlling an appropriate (the) management circuit for the processing units, e.g., and in an embodiment, that can be configured to set the access windows for a group of processing units.

In an embodiment, the system (and in an embodiment the management circuit) supports a particular, in an embodiment selected, and in an embodiment fixed, (total) number of access windows that can be used to access the processing units, and the controller operates to allocate those access windows between the different groups of processing units that the controller has allocated. For example, the system may support up to sixteen access windows (communications interfaces (sets of communications registers)), with the controller correspondingly being operable to distribute those sixteen access windows between the different groups of processing units that it configures. The controller could, e.g., allocate the same number of access windows to each group of processing units, or could allocate different numbers of access windows to the groups of processing units, as desired.

In an embodiment, each access window has associated with it (allocated to it) one or more identifiers that can and will be used to tag and identify memory transactions (e.g. DRAM transactions) for the (partition of) processing units that the access window in question is assigned to. In an embodiment each access window is assigned two identifiers, a "protected" identifier that will be used to tag and identify memory transactions that should be protected (that should be performed in a secure manner), and a "non-protected" identifier that should be and is to be used to tag and identify memory transactions that do not need to be protected.

Thus, in an embodiment, as well as assigning an access window or windows to the groups of processing units, the controller also operates to assign to each access window one or more identifiers (e.g., and in an embodiment, stream IDs) for use with that access window, and in an embodiment a "protected" and a "not protected" identifier for use with the access window. (The identifiers that are used for this may be provided (e.g. generated) by the controller as well, or they may, e.g., be such identifiers that are otherwise specified by or in the system, with the controller then operating to associate those provided identifiers with the appropriate access windows.)

These identifiers (stream IDs) should be and are in an embodiment used for and to tag (identify) memory transactions from the processing units (within the partition) that the access window is assigned to (rather than, e.g., being used for the access window "itself", on transactions from a virtual machine to the access window communication registers, for example).

Such identifiers will allow the system to isolate the memory the processing units for an access window can access, for example, and in an embodiment, to match the existing restrictions on the memory the virtual machine in question can access (via its processor (CPU)).

Thus, in an embodiment, the system includes a memory management unit (MMU) placed between the processing units and any (memory) interconnect, that uses the identifiers (stream IDs) to determine which access window and virtual machine memory transactions from a processing unit are associated with. (This MMU may be configured by a hypervisor, for example, to match the translations in the (host) processor (CPU) level-2 MMU, such that the processing unit restrictions/translations match the (host) processor (CPU) ones.)

In an embodiment, the data processing system comprises a plurality of communication buses (e.g. AXI buses) over which the groups of processing units can be accessed. In an embodiment, each group of processing units is allocated (assigned) to a respective, separate, communications bus over which the processing units in that group will be accessed. Thus, in an embodiment, each group of processing units is correspondingly allocated to its own, separate (independent) communications bus (and the different groups of processing units do not share communications buses).

In an embodiment, there is one bus that is configured to support and intended for carrying "safety critical" (secure)

communications (traffic), and one or more other buses that are otherwise than (not) configured and intended for safety-critical (secure) communications (traffic).

This will then facilitate keeping communications traffic for the different groups of processing units separate. For example, a group of processing units that is to be used for safety-critical applications may be allocated to a bus that is separate from the bus or buses used for another group or groups of processing units (e.g. that are being used for non-safety critical applications), thereby, for example, allowing safety and non-safety critical (bus) traffic to be kept separate, and helping to protect against, for example, denial of service attacks to safety-critical traffic.

Thus, in an embodiment, the data processing system has plural communications buses for communicating with the processing units of the system, and the processing units of the system are correspondingly in an embodiment dividable into up to as many groups of processing units as there are separate communication buses. In an embodiment, the processing units are divided into a number of groups of processing units corresponding to the number of separate communication buses (for communicating with processing units) that the data processing system has.

In one such embodiment, the data processing system has two separate communications buses over which the processing units may be accessed, and the processing units are correspondingly divided into two separate groups of processing units, with each group of processing units being assigned to, and being accessed through, a respective (different) one of the communications buses. In this case, one bus and group of processing units is in an embodiment allocated to and configured to support safety-critical applications and operations, and the other bus and group of processing units is not (is otherwise than) configured to support safety-critical applications and operations.

In an embodiment, the controller is operable to and operates to assign a group of processing units that it has configured to a respective communications bus. This is in an embodiment done when the controller configures the groups of processing units. Thus, as well as dividing the processing units into respective groups of processing units, the controller will also assign each group of processing units to a respective communications bus (and configure the communication to and from the group of processing units to take place over (and only over) the communications bus that the group of processing units is assigned to).

The controller can assign a group of processing units to a communications bus in any suitable and desired manner. In an embodiment, this is again done by controlling a (the) management circuit associated with the processing units to set the communication bus and protocols for the group in question to use the corresponding bus that the group is to be assigned to.

In an embodiment, the (plural) communications buses over which the respective groups of processing units will be accessed by the virtual machines, are, as discussed above, separate to (and in addition to) the (restricted) communications bus or buses over which the controller is able to communicate (e.g. with the management circuit) to configure the processing units of the data processing system into the respective groups of processing units, and to allocate the respective access windows and buses, etc., to the groups of processing units.

It will be appreciated from the above that in embodiments of the technology described herein at least, the controller is operable to configure and set up respective graphics processing resource "groups" for the data processing system, which resource groups will each comprise: a respective (and different) set of one or more of the processing units of the system; a set of one or more independently allocatable subsets (partitions) of the processing units of the group that the group supports; a set of one or more access windows to be used by virtual machines to access the subsets (partitions) of the group; and a communications bus over which the processing units in the group can (and will) be accessed.

The controller may be operable to divide the available graphics processing resources into respective graphics processing resource "groups" in response to and under the control of other elements or components of the system. For example this may be encoded in the firmware for the system, and/or set by suitably privileged software for the system, such as an appropriate hypervisor. For example, firmware for the system could specify how the available graphics processing resources are to be distributed between different groups (and that configuration correspondingly changed with appropriate firmware updates).

Additionally or alternatively, the controller may itself be operable to determine how to distribute the graphics processing resources into respective groups, for example in response to events within the system.

Once the controller has configured and set up the groups of processing units, etc., then each group should be and is in an embodiment associated with a corresponding arbiter of the data processing system which will control access to the processing units of the group (and in particular to the respective subsets (partitions) of the processing units that the group supports) by virtual machines that require processing operations.

The system should, and in an embodiment does, comprise (at least) two arbiters, but it may have more than two arbiters, if desired.

The arbiters in this regard may be any suitable and desired element or component that is able to configure and control access by virtual machines to the processing units of a group. In an embodiment, the (and each) arbiter is a suitable software arbiter, that is executing, e.g., and in an embodiment, on a processor (e.g. a CPU) of the data processing system. In this case, each arbiter in an embodiment executes on a different processor to the processor that the controller that configures the groups of processing unit executes on. In an embodiment, a (and each) arbiter may be, and is in an embodiment, associated with a hypervisor (e.g., and in an embodiment, for the virtual machines) that is executing on the processor in question. (However, the arbiter should be, and is in an embodiment, separate to the hypervisor, and (in an embodiment) does not have the same level of privilege as (has a lower level of privilege than) the hypervisor.) The arbiter may itself execute as, or as part of, a virtual machine on the processor in question.

There may be plural arbiters executing on a given processor (with each arbiter in an embodiment being able to be independently allocated to and associated with a group of processing units), or there may only a single arbiter executing on a given processor, as desired.

In an embodiment, there is (at least) one arbiter which is configured to operate in a secure (safety-critical) manner, and another arbiter or arbiters that is not configured and not required to operate in a secure (safety-critical) manner. In this case, the safety-critical and non-security critical arbiters in an embodiment execute on different processors of the system.

The arbiters are all in an embodiment isolated from each other (i.e. such that there is separation between the arbiters, such that one arbiter's operation cannot affect another arbiter's operation). Thus, each arbiter is in an embodiment isolated from all of the other arbiters (and from the controller). The different processors that the arbiters execute on are also correspondingly in an embodiment isolated from each other (e.g., and in an embodiment to ensure that one processor cannot affect another processor in any way).

Thus in an embodiment, the data processing system comprises two or more processors that are operable to and that execute groups of one or more virtual machines, with each processor correspondingly executing one or more arbiters for managing a group of processing units for virtual machines of the processor. Each of the processors that execute virtual machines and arbiters are in an embodiment isolated from each other, such that there will be a set of suitably isolated processors executing arbiters and virtual machines to which the (privileged) controller can then allocate groups of the processing units.

In an embodiment, the data processing system comprises (at least) two processors: one processor which is configured to operate in a secure (safety critical), manner and that executes, inter alia, a "safety-critical" arbiter (and, correspondingly, a group of one or more safety critical virtual machines); and a second processor that is not configured to operate in a secure (safety-critical) manner, and that correspondingly executes a "non-safety" critical (secure) arbiter (and non-safety critical (secure) virtual machines). (As discussed above, in an embodiment, there is also a third, separate, (and in an embodiment privileged) processor on which the (privileged) controller executes.)

These processors are in addition to, and separate to, the processing units themselves.

(It should also be noted here that each such processor may comprise a single processor or a processor "cluster", and thus references to processors herein are intended to refer to and encompass there being a single processor or a processor cluster, unless the context requires otherwise.)

Correspondingly, in embodiments of the technology described herein at least, there will be a privileged controller that is operable to assign groups of processing units to (isolated) processors, within which processors independent (and isolated) arbiters exist to manage the assigned resources (and there should and is in an embodiment, no overlap in the resources managed by the different arbiters).

Thus, in an embodiment, the system of the technology described herein will comprise an appropriately privileged controller, e.g., executing on an appropriately privileged processor, operable to configure the processing units into respective groups of the processing units, and then two or more arbiters, that, in an embodiment, do not have the privilege of the controller (and that are in an embodiment equal in privilege to each other), but that are isolated from each other, and which are each respectively able to, inter alia, control access to processing units of a group that they have been allocated, with at least one of the arbiters in an embodiment being used for safety critical virtual machines (and operating in an appropriately "safety critical" manner).

While the arbiters in an embodiment do not have the privilege level of the controller, they do in an embodiment have a higher level of privilege than the virtual machines themselves. Thus the virtual machines that are to use the processing units will have a lower (the lowest) level of privilege as compared to the controller and the arbiters.

The allocation of the groups of processing units to the arbiters can be achieved in any suitable and desired manner. This may, for example, be fixed by virtue of the configuration of the groups of graphics processors.

For example, where there are plural different processors of the system, each executing a respective one or more arbiters and one or more virtual machines, and each having their own corresponding, and separate, bus for communicating with the processing units, then the allocation of a group of processing units to one of the buses will, correspondingly, allocate to that group of processing units to the arbiter(s) and virtual machines for the processor that the bus in question corresponds to.

Alternatively or additionally, the controller may also or instead be operable to allocate groups of processing units to respective arbiters. This may be possible in the case where, for example, the controller can also configure the communications paths of the buses to respective different arbiters and/or processors of the system. In this case therefore the controller may, for example, configure the management circuit to correspondingly configure the communications paths appropriately so that groups of processing units are allocated to respective (and the desired) arbiters.

Thus, in one embodiment the controller is further operable to allocate the groups of processing units to respective arbiters of the plurality of arbiters.

In an embodiment, irrespective of how the actual allocation of the groups of processing units to respective arbiters is done, the controller is in an embodiment operable to, and operates to, inform the respective arbiters of the groups of processing units (and the configuration of those groups, e.g. in terms of the partitions, access windows, etc.) that they have been assigned. Thus the controller is in an embodiment operable to send to each arbiter an appropriate group assignment information, to inform the arbiter of the relevant information, e.g. configuration, of the group of processing units (of the group of graphics processing resources) that it has been assigned. This is in an embodiment done by means of appropriate communication between the controller and the arbiters.

In an embodiment, an arbiter is associated with (operates for) a given, particular, set of virtual machines (e.g. any virtual machine that is executing on the processor that the arbiter is executing on). Thus, allocating a group of processing units to an arbiter correspondingly associates that group of processing units with a particular group of virtual machines. Thus, in embodiments at least, the controller will also, in effect, allocate respective virtual machines to a group of processing units that it has configured.

In an embodiment, a virtual machine is associated with and able to access the processing units under the control of only a single arbiter of the system. Thus any given virtual machine will, in an embodiment, only be able to access and use the group of processing units that is associated with the arbiter that the virtual machine is associated with (and each group of processing units will in an embodiment be associated with a distinct and different group of one or more virtual machines).

In general an arbiter can be associated with any suitable and desired number of virtual machines. Thus a given arbiter may, for example, provide access to a group of processing units to only a single virtual machine. In an embodiment, a, and in an embodiment each, arbiter is able to provide access to its corresponding group of processing units for plural virtual machines (although not necessarily at the same time).

As discussed above, in an embodiment, there are plural (host) processors in the data processing system, with each processor supporting and executing one or more groups of one or more virtual machines, and a corresponding arbiter or arbiters for the group or groups of virtual machines.

In an embodiment, the data processing system comprises two processors that execute arbiters for controlling access to two respective groups of processing units (one for each processor), with each processor correspondingly executing one or more virtual machines, with those virtual machines using the arbiter for their processor to access the group of processing units that is allocated to their arbiter (and thus to the processor in question).

In one such embodiment, each processor correspondingly has its own, separate, communications path (bus) for communicating with the processing units, and so the configuration will be such that the communications path (bus) for one of the processors is assigned to one group of processing units, and the communications path (bus) for the other processor is assigned to the other group of processing units. In this case, as discussed above, in an embodiment, one of the processors is part of and operates in a "safety" critical domain, and the other processor is part of (operates in) a non-safety critical domain.

Thus a first set of virtual machines that are to operate in a safety critical manner, may, and in an embodiment do, execute on a first processor of the system that executes a correspondingly secure (safety critical) arbiter and has a correspondingly secure communication path with the processing units, and a second set of virtual machines that are not required to be operated in a safety critical (secure) manner execute on a second processor of the system, which does not operate in a safety critical (secure) manner, and which correspondingly executes its own arbiter and has a separate "non-secure" communications path to the processing units.

There may be a third processor with its own arbiter, virtual machines, group of processing units, bus, etc., if desired (and so on, if desired).

Once the groups of processing units have been allocated to respective arbiters (and the arbiters have been informed of their group "assignments"), then the arbiter for a group of processing units can, and in an embodiment does, complete the configuration of the group of processing units, so that the group of processing units is then available for use by virtual machine(s) under the control of that arbiter.

In this regard, the arbiter for a group of processing units is in an embodiment operable to and in an embodiment operates to, configure and organise the processing units of the group into the allocated number of independently allocatable partitions of processing units of the group (as discussed above). (As discussed above, the controller in an embodiment sets for a (and each) group of processing units how many different partitions of processing units the group will and should support, but the arbiter is then operable to determine and to set (configure) how the processing units in the group are distributed between the different partitions for the group.)

In this regard, the arbiter can in an embodiment configure a given partition of processing units to comprise only a single processing unit (that will then operate in a standalone manner), or to comprise plural processing units that will operate in combination (with, in that case, one of the processing units in an embodiment acting as a master processing unit controlling the other processing units as "slave" processing unit(s)). (This may, of course, depend upon how many processing units are in the group, and the number of independent partitions that the group is to provide (support).)

Where a group of processing units is configured and set to support plural partitions (subsets) of processing units, each subset (partition) within a group may contain the same or a different number of the processing units in the group. In an embodiment, there is no sharing (at the same time) of processing units within a group between different independently allocatable partitions of the processing units in the group. Thus each independently allocatable partition of processing units within a group of processing units in an embodiment contains (completely) different processing units of the group to the other partition or partitions of processing units in the group.

It should be noted here that a (and each) arbiter should not be able to, and in an embodiment is not able to, change which resources (e.g. processing units) are in its (and in each) group, nor able to access resources (e.g. processing units) outside its group. Rather, a (and each) arbiter is constrained and configured only to be able to access and configure the resources that are allocated to its group by the controller.

The arbiter can configure the processing units of its group of processing units into the desired subsets (partitions) of processing units in any suitable and desired manner.

In an embodiment, this is done by the arbiter controlling and configuring an appropriate (the) management circuit that is operable to configure the processing units, and in particular the internal communication paths and communication between the processing units, accordingly. The arbiter in an embodiment controls the same management circuit as the controller for this purpose.

The arbiter for a group of processing units in an embodiment controls the management circuit to configure the operation of a (and e.g. each) processing unit to form the desired subsets (partitions) of the processing units of the group using a suitable (arbiter) configuration interface of the management circuit. This interface is in an embodiment only accessible to an arbiter, i.e. such that any virtual machine controlling a processing unit to perform data processing tasks cannot itself operate to set the configuration of the processing unit(s). This may be beneficial for safety and/or security purposes. (Correspondingly, an arbiter is in an embodiment not allowed to access a processing unit while it is in use by an access window, to ensure isolation between the arbiter and the data of the virtual machine that the access window corresponds to (and that is using the processing unit).)

The arbiter configuration interface in an embodiment comprises a set of configuration registers that are accessible to the arbiter in question. This is in an embodiment in a separate register block to the "access window" communication registers that a virtual machine will use to access and communicate with the processing unit(s).

The management circuit can configure the processing units of a group of processing units as the desired subsets (partitions) of the processing units under the control of an arbiter in any suitable and desired manner. In an embodiment, this is done by appropriately setting internal communication networks of the processing units, and the ability (or otherwise) of the processing unit(s) to communicate with other processing unit(s) in the group, so as to allow communication relevant to the required operating mode for the processing unit or units of the subset (partition) in question (and to prevent communication that would be inappropriate for the operating mode in question and/or appropriate for another operating mode).

Thus, for example, where a processing unit is in a partition of "one", and so is to act in standalone mode, any communication to other processing units, e.g. via a communications bridge or bridges of the processing unit should be, and is in an embodiment, disabled (prevented). Correspondingly, where a processing unit is to act as a master or slave processing unit (i.e. is in a partition of more than one processing unit), then communication over the communication bridges of the processing unit and its corresponding slave or master processing units should be, and is in an embodiment, enabled and configured accordingly.

This may be done, for example, by setting one or more switches controlling the internal communications network(s) of the processing unit(s) and/or the communication bridges to other processing units of the group of processing units appropriately.

As well as the management circuit configuring the appropriate communications for the processing units to form the desired subsets (partitions) of the processing units, the configuration of the processing units into the desired subsets (partitions) may, and in an embodiment does, also comprise configuring the operation of the processing units appropriately as well.

For example, in the case where a partition comprises plural processing units, one of the processing units (the master processing unit) is in an embodiment configured to provide the software interface to a virtual machine for itself and its set of one or more slave processing units. This then has the advantage that to any virtual machine that is using the partition, it still appears as though there is only a single processing unit.

Thus, when a processing unit is to act as a "master" processing unit, a management unit (e.g. "job manager") for that master processing unit in an embodiment provides the software interface (e.g. to the driver for the virtual machine in question) for the linked set of master and its respective slave processing units.

Similarly, the management unit of the master processing unit is in an embodiment configured to distribute processing task processing across the master and slave processing units that it is controlling (but the arrangement is such that from the software (driver) side, there is still only a single processing unit that is being instructed and to which the processing task is being sent).

Correspondingly, when a processing unit is to operate in slave mode (as a slave processing unit under the control of another master processing unit), then the operation of the processing unit is in an embodiment configured accordingly. For example, any functional units that are redundant in a "slave" processing unit are in an embodiment made inactive when a processing unit is configured to operate as a "slave".

In an embodiment, an arbiter for a group of processing units can reconfigure the allocation of processing units of the group to the respective partitions for the group in use. In this case, a given processing unit and/or partition is in an embodiment reset and/or powered off (and then restarted) when it is reconfigured. Correspondingly, if there is a virtual machine accessing a partition that is to be reconfigured, there is in an embodiment an appropriate handshaking procedure to allow the processing for that virtual machine to be appropriately stopped and suspended, before the reconfiguration takes place.

Once the processing units for a group of processing units have been respectively configured for operation (e.g. into respective (subsets) partitions of the processing units), then virtual machines that are to use the group of processing units can be allowed to access the partitions of processing units of the group, to have the partitions of processing units of the group perform processing operations for the virtual machines.

The virtual machines that access a group of processing units may take any suitable and desired form. For example, a virtual machine may execute one or more applications and/or may itself be implemented by an application. The virtual machines (and e.g. applications) may run on any desired and suitable processor, such as one or more (e.g. host) processors (e.g. central processing units) of the data processing system (as discussed above).

As discussed above, this operation is performed under the control of and by an arbiter for the group of the processing units, which arbiter is operable to allocate processing units (and in an embodiment the partitions) of the group of processing units to respective virtual machines.

In an embodiment, and as will be discussed further below, the arbiter for a group of processing units can in an embodiment allocate and grant access to the processing units of the group to different virtual machines at different times, e.g., and in an embodiment, so as to be able to, and to, share the processing units of the group between plural virtual machines that are able to access the group in a time divided manner.

The arbiter in an embodiment controls access to and allocates processing units of the group of processing units to virtual machines by enabling respective access windows of the group to have access to respective processing unit(s) (partitions) of the group, such that a virtual machine can then communicate with the processing unit(s) (partition) using the access window in question. Thus, the arbiter will be able to allow access to virtual machines that have corresponding access windows (address ranges) for accessing processing units of the group of processing units in question.

Thus, in an embodiment, in order to allow a virtual machine to access (a partition of) the processing units of a group, the virtual machine should be, and is in an embodiment, first allocated one of the access windows for the group, such that the virtual machine can then use the access window to access and use a subset (partition) of the processing units of the group.

Thus, for a group of virtual machines that it is intended will have access to a group of processing units, each of those virtual machines will correspondingly be allocated an access window (address range) that has been associated with the group of processing units.

In an embodiment, (all of) the access windows for a group are allocated to virtual machines that are to use the group in one go, e.g., and in an embodiment, as part of an initialisation process. This may be particularly desirable in the case where the access windows are also used for communication between the virtual machines and the arbiters, as in that case the access window may need to be assigned in order, e.g., for a virtual machine to be able to request processing resource from the arbiter.

Alternatively, an access window could be given to a virtual machine as and when the virtual machine itself is initialised and/or first requests graphics processing resource from the arbiter.

The access window assignment is in an embodiment done via configuration of an MMU (the address mapping for the virtual machine in question).

The allocation of access windows to virtual machines (and the MMU configuration, for example) is in an embodiment done by a hypervisor for the virtual machine(s), as that will then allow the arbiters to be isolated from that process (and thus from controlling which devices a virtual machine can access).

In an embodiment, once an access window has been allocated to a virtual machine, that virtual machine retains possession of that access window for its use (i.e. there is no changing of the access window for a virtual machine, or moving access windows from one virtual machine to another) (unless and until there is an appropriate, e.g. system, reset).

It will be appreciated that the number of access windows that are allocated to and associated with a group of processing units will accordingly, and in an embodiment does, determine how many different virtual machines can access and use the group of processing units in use. Thus, the number of access windows that are allocated to and associated with a group of processing units may correspondingly be selected and set based on how many different virtual machines it is expected may wish to access and use the group of processing units.

Once a virtual machine has been allocated an access window for accessing the group of processing units, it can, and in an embodiment does, use that access window to access and to use the processing units (a partition of the processing units) of the group. This is done under the control of the arbiter for the group.

For example, and in an embodiment, a virtual machine that requires processing operations by a processing unit may make a request for an appropriate processing resource from the arbiter, with the arbiter then determining whether and how to grant the requested processing resource to the virtual machine.

When a virtual machine is to be allowed access to a partition of the processing units of the group, then the arbiter in an embodiment permits that by enabling the access window (address range) associated with the virtual machine to allow the virtual machine to access and communicate with the partition of the processing units of the group that is to be allocated to the virtual machine in question.

This is in an embodiment done by the arbiter enabling the communications interface (the set of communications registers) that the access window (address range) for the virtual machine in question corresponds to for communication with the partition of the processing units in question (and, in an embodiment, such that none of the other access windows can be used to communicate with the partition in question), so that the virtual machine can then use its access window to address the communications interface in question, to thereby communicate with the partition of processing units appropriately.

(As discussed above, each access window in an embodiment comprises and corresponds to a communications interface (set of registers) that can be used to communicate with (a partition of the) processing units, such that by enabling communications between a particular access window (communications interface) and the processing units, that correspondingly permits a virtual machine to use its access window to control and communicate with the (partition of) processing units in question.)

Again, a given access window (communications interface) is in an embodiment enabled for a given partition of a group by the arbiter controlling an appropriate (the) management circuit for the processing units, to thereby enable the communications interface in question for communication with (and to control) the partition of the group of processing units in question.

Thus the arbiter will control the management circuit to assign the access window to the partition in question.

Thus, in an embodiment, the operation in the manner of the technology described herein comprises a virtual machine making a request to the arbiter for access to graphics processing resources, with the arbiter in response to such a request then allocating a subset (partition) of the processing units of its group of processing units to the requesting virtual machine, e.g., and in an embodiment, by enabling the access window for the virtual machine for communication with the subset (partition) of processing units that is to be allocated to the virtual machine.

The arbiter can operate to allocate (and to determine how to allocate) subsets (partitions) to virtual machines in any suitable and desired manner.

For example, and in an embodiment, this may be done on the basis of information from other components in the system, such as an indicated desired use of the system by the user (with the arbiter then, e.g., (trying to) provide a resource assignment that results in better user experience).

The information that the arbiter uses when determining how to allocate the resources to the virtual machines could, e.g., come from a hypervisor, but could also or instead be based on the occurrence of events in the system, such as user triggered events (such as a user activating a system, such as an infotainment system in an automotive context, that requires additional processing resources, for example).

The allocation could also or instead be based on use-case or priority or other information provided by the virtual machines that are requesting the processing resources.

The allocation could, for example, take account of the processing requirements for the virtual machines, for example, and in an embodiment, whether the processing requirements for a virtual machine can be provided by a partition containing fewer (e.g. only one) processing units, or whether the virtual machine should (ideally) be allocated a "higher powered" partition, e.g. comprising a combined set of plural processing units. This may, e.g., be determined in advance, or more flexibly, in use.

There may, e.g., be one or more "initial", default allocation(s) that the arbiter will adopt, e.g. depending upon particular criteria being met, but with the arbiter then, e.g., being operable to adjust that allocation based on, e.g., the occurrence of events and/or the provision of additional information, e.g. from other components of the system.

(In general, it is an advantage of the system of the technology described herein that the allocation of resources by the arbiter (and correspondingly by the controller) can be performed flexibly and adaptively in use, and so the system can be adapted to, and adapt to, different designs and use cases.)

An arbiter is in an embodiment operable to share one or more of the partitions of the group between plural, different virtual machines, e.g., and in an embodiment, on a time divided basis (this may be done, e.g., there are more virtual machines wishing to use the group of processing units than there are independently allocatable subsets (partitions) of processing units in the group). In this case, the arbiter could, and in an embodiment does, allocate a partition to a first virtual machine for a particular, in an embodiment selected, in an embodiment predefined time period, and then allocates that same partition to a different virtual machine for a next selected, particular, in an embodiment selected, in an embodiment predefined time period (and so on, as required). For example, a partition could be shared equally between two different virtual machines by repeatedly swapping access to the partition between the virtual machines over time. The arbiter may be configured to do this automatically in the case where plural access windows are defined as sharing the same partition.

Thus the arbiter is in an embodiment operable to and configured to enable and disable the association of access windows with respective partitions of the group of processing units, so as to permit different virtual machines to access a given partition of processing units at different times.

This will then enable the arbiter to share the processing units of the group (and in particular different partitions of processing units of the group) between different virtual machines in a time divided manner.

Thus, the arbiter is in an embodiment operable to, and able to, enable (and disable) access to partitions of the processing units by access windows (and thus virtual machines) in use, e.g. after the data processing system is powered or booted up and/or while the data processing system remains powered or booted up. This can then allow (partitions of) processing units to be allocated (and, e.g., reallocated) to and from different virtual machines in a flexible and adaptable manner, e.g. without needing to power down or re-boot the data processing system.

Thus, in an embodiment, the arbiter is operable to enable a first access window for accessing a given partition of its group of processing units, and to then, at a later time, disable the permission of that access window to access that partition of the group of processing units, and enable a second, different access window (and thus virtual machine) to have access to that partition of processing units (and so on).

Correspondingly, the arbiter may enable a given access window (and thus virtual machine) to access a first partition of the processing units at one time, but then enable that access window (and thus virtual machine) to access a second, different, partition of the group of processing units at a second, different time (i.e. such that the access window and virtual machine in question will be successively permitted to access different partitions of the group of processing units).

When an access window for a partition is to be changed, then the arbiter in an embodiment operates to stop the access of the current access window to the partition, and to then configure the new access window for access to the partition. In an embodiment, the partitions also reset and/or powered off (and then restarted) when the access window for the partition is changed.

Correspondingly, where a virtual machine's access to a partition of a group of processing units is to be disabled, then the arbiter in an embodiment performs an appropriate "handshaking" procedure with the virtual machine before disabling the access to the partition of processing units, e.g., and in an embodiment, so as to allow the virtual machine and the partition of the processing units to appropriately stop and/or suspend the processing tasks for the virtual machine prior to disabling the access of the virtual machine in question.

Correspondingly, where a virtual machine's access to a partition of a group of processing units is to be (newly) enabled, the arbiter in an embodiment performs an appropriate "hand shaking" procedure with the virtual machine before enabling the access to the partition of processing units, e.g., and in an embodiment, so as to allow the virtual machine and the partition of the processing unit to appropriately start and/or resume the processing tasks for the virtual machine after enabling the access of the virtual machine in question.

Once an access window has been enabled so as to thereby permit the corresponding virtual machine to access a partition of the processing units of a group, the arbiter in an embodiment correspondingly informs the virtual machine in question that it now has access to a partition.

Any communication between the arbiter and a virtual machine in an embodiment takes place via the management circuit, and in particular via the communication interface (access window) allocated to the virtual machine. Thus the virtual machines and arbiter will communicate with each other via the access windows allocated to the virtual machines (the communications interfaces for the virtual machines supported by the management circuit for the processing units).

As discussed above, in an embodiment, the access windows include registers for passing messages between a virtual machine and the arbiter, e.g. that pass messages to registers accessible to the arbiter, and vice-versa, for this purpose.

This then avoids needing the involvement of the hypervisor when passing messages (communicating) between the arbiter and a virtual machine, such that that can be done directly.

In an embodiment the communication takes place via a processing unit driver that is associated with the virtual machine (the driver for the processing units that the virtual machine communicates with).

Once a virtual machine has access to a subset (partition) of a group of processing units, then it can, and in an embodiment does, communicate with that partition, using its access window, for example, and in an embodiment, by setting the communications interface (communications registers) corresponding to its access window appropriately (e.g., and in an embodiment, by addressing those registers using the address range of its access window).

In an embodiment, the virtual machine(s) communicate with the processing units (the partitions) via an appropriate driver (processing unit driver) that is associated with the virtual machine(s) (which driver, e.g., and in an embodiment, is executing on a processor of the data processing system, such as, and in an embodiment, the same processor as the processor that the virtual machine is executing on).

Once an access window has been enabled, then the partition of the processing units in question should be, and is in an embodiment, controlled directly by the virtual machine in question (via, as discussed above, an appropriate driver for the virtual machine) to perform the desired processing tasks for the virtual machine. Thus the virtual machine (and driver) will control the partition of the processing units directly (e.g. not via the arbiter) using the access window (communications interface) in question.

As discussed above, in an embodiment at least, where a partition of processing units of a group comprises more than one processing unit, then the system and operation is in an embodiment still configured such that the partition containing plural processing units is seen from the perspective of the virtual machine (and in particular to the driver for the virtual machine) as a single addressable processing unit.

As discussed above, although in an embodiment of the technology described herein, the processing units are graphics processing units, the technology described herein can equally be used with other forms of processing units, such as video processing units, machine learning accelerators, etc.

Similarly, again although the technology described herein has been discussed with the example of allocating different groups of (graphics) processing resources as between safety critical and non-safety critical domains, the technology described herein can equally be used to subdivide groups of processing resources between other forms of domains, such as secure and non-secure (security and non-security) domains, etc., as desired.

As will be appreciated from the above, in embodiments of the technology described herein at least, the available processing units (and processing resources) are divided into two (or more) groups of processing resources, with one of the groups, e.g. intended to be used and operated within a "safety critical" domain, and another of the groups intended to be used for and operable in a non-safety critical domain. Moreover, processing resources (and in particular processing units) may be moved between the safety and non-safety groups (and thus domains) in use (e.g., and in an embodiment, under the control of the controller).

In order to support this operation, the data processing system in an embodiment includes, and can implement, one or more "fault protection" mechanisms so as to be able, for example, to provide the appropriate levels of integrity for the processing units and their management circuit when operating in and for a safety-critical domain.

While it would be possible in this regard to configure the processing units (and their associated management circuit) to always operate in a "safety critical" manner (with a sufficiently high level of fault protection for safety-critical operation), in an embodiment the management circuit for the processing units is operated with a higher level of fault protection at all times, but the processing units can be operated with different levels of fault protection at different times, e.g. (at least) with either a higher level of fault protection or a lower level of fault protection (with the higher level of fault protection being used, e.g., and in an embodiment, when the processing unit is to be part of a safety-critical group (domain), but the lower level of fault protection being able to be set and used, e.g. when the processing unit is not part of a safety critical group (domain)).

This then avoids the need to have to configure the processing units to operate permanently at a higher level of fault protection (which may have a cost in terms of performance and/or die area), whilst still allowing the processing units to be flexibly and adaptably configured into both safety and non-safety groups, and being able to provide appropriate levels of fault protection (integrity) to a processing unit when that is desired (e.g. it is included in a "safety" group (domain)).

Thus, in an embodiment, the management circuit associated with the processing units that is operable to configure the processing units into groups is configured to operate with a higher level of fault protection at all times, but the groups of the processing units can be controlled to operate with either of at least two modes of fault protection, where one mode has a higher level of fault protection than the other mode (with either a higher level of fault protection or a lower level of fault protection).

Correspondingly, the method of the technology described herein in an embodiment comprises operating the management circuit with a higher level of fault protection (at all times), but selectively operating the groups of the processing units with either of at least two modes of fault protection, where one mode has a higher level of fault protection than the other mode (with either a higher level of fault protection or a lower level of fault protection).

The Applicants further believe that such arrangements may be new and advantageous in their own right in the context of providing processing unit resources that may be adaptably and flexibly used, e.g. for both safety critical and non-safety critical operations, and not just when that is done in the manner of the earlier embodiments of the technology described herein.

Thus, a further embodiment of the technology described herein comprises a data processing system comprising:
a plurality of processing units;
a management circuit associated with the processing units and operable to configure the processing units of the plurality of processing units into respective groups of the processing units, wherein each group of processing units comprises a set of one or more of the processing units of the plurality of processing units;

wherein:
the management circuit is configured to always operate with a higher level of fault protection;
and
groups of the processing units can be selectively operated with either of at least two modes of fault protection, where one mode has a higher level of fault protection than the other mode.

A further embodiment of the technology described herein comprises a method of operating a data processing system, the data processing system comprising:
a plurality of processing units; and
a management circuit associated with the processing units and operable to configure the processing units of the plurality of processing units into respective groups of the processing units, wherein each group of processing units comprises a set of one or more of the processing units of the plurality of processing units;
the method comprising:
operating the management circuit with a higher level of fault protection; and
the management circuit configuring the groups of the processing units such that:
at least one of the groups of the processing units will be operated with a higher level of fault protection; and
at least one other group of the processing units will be operated with a lower level of fault protection.

In these embodiments of the technology described herein, the management circuit that configures the processing unit groups is operated with a higher level of fault protection (at a higher level of integrity) at all times. On the other hand, the level of fault protection (integrity) for the groups of processing units can be set and reconfigured between (at least) two different modes (levels) of fault protection, namely (at least) a higher level of fault protection and a lower level of fault protection. This may, for example, and in an embodiment, be done to configure a group of processing units to operate at a higher level of fault protection when it is to be used for safety critical operations, but to operate at a lower level of fault protection when not part of a safety critical domain.

This then avoids the need to operate all of the processing units at a suitably high level of fault protection all of the time (which may have a corresponding impact in terms of performance and/or silicon area), whilst still being able to provide a higher level of fault protection when required. These embodiments of the technology described herein can thus provide a system in which processing unit resources can be flexibly and adaptively configured into groups, with a group or groups of the processing unit resources being able to be operated at a higher level of fault protection when desired, but at a reduced cost as compared, for example, to systems that operate with a higher level of fault protection for all of the processing units at all times.

As will be appreciated by those skilled in the art, these embodiments of the technology described herein can, and in an embodiment do, include any one or more or all of the features of the technology described herein described herein, as appropriate.

Thus, for example, the management circuit is in an embodiment operable to configure the processing units into groups by configuring a (configurable) communications network that sets the communications paths between the processing units, and from and to the (groups of) processing units (e.g., and in an embodiment, to and from the management circuit and/or respective arbiters and virtual machines), and in an embodiment does that under the control of a suitable controller (as discussed above).

Correspondingly, the processing units can in an embodiment be organised into respective partitions of the processing units (in a group), in an embodiment under the control of an arbiter for the group (and that controls the management circuit accordingly).

Similarly, the management circuit in an embodiment supports the subdivision of the processing units into a given number of such partitions and/or provides a number of access windows for allowing virtual machines to access and communicate with (partitions of) the processing units.

These embodiments of the technology described herein relate in particular to the provision of fault protection to the management circuit and the groups of processing units. In the technology described herein, such fault protection can be provided by using mechanisms that (help to) prevent faults from occurring (in the first place), but also or instead by checking for and detecting faults (i.e. such that the detected faults will not in themselves be prevented) (and then, in an embodiment, taking appropriate, e.g., remedial, action) (i.e. detecting faults and then, e.g., and in an embodiment, protecting against the consequences of them).

Indeed, and as will be discussed in more detail below, in the particularly embodiments of the technology described herein, the fault protection of the present embodiments comprises providing and performing some form of fault detection (testing/monitoring) (or not, e.g. in the case of a lower level of protection), without necessarily, and without requiring, also (actively) preventing faults from happening in the first place.

Thus references herein to fault protection and providing fault protection are intended to encompass (and cover) both operating to prevent faults, but also providing and performing fault detection testing/monitoring alone (and without necessarily also operating to prevent faults), and are not restricted only to mechanisms that operate to prevent faults The higher level of fault protection that the management circuit is operated at can be any suitable and desired level of fault protection (that is higher than the lower level of fault protection that the processing units can be selectively operated at—the minimum requirement is that the management circuit is operated with a higher level of fault protection than the lower level of fault protection that a group of processing units may be operated at). In an embodiment it is a level of fault protection that is suitable for desired safety-critical operation in the data processing system in question, e.g., and in an embodiment, that meets a particular "safety" standard (certification) (e.g. that may be defined for the intended use of the data processing system), such as a specified automotive safety standard (such as ISO26262).

The management circuit can be configured to operate at (and be operated at) a higher level of fault protection at all times in any suitable and desired manner.

In an embodiment, this is done by protecting the (operation of the) management circuit using a fault protection (and in an embodiment a fault detection) mechanism at all times. In other words, the management circuit will have an "always on" fault protection (in an embodiment fault detection) mechanism that is operable to provide fault protection for the operation of the management circuit at all times (whenever the management circuit is operating).

Such a fault protection mechanism can be any suitable and desired form of fault protection mechanism that provides fault protection at all times, such as the use of fault prevention mechanisms, such as (permanently active) internal error checking (e.g. in which the management circuit includes (permanently active) error checking mechanisms, such as, and in an embodiment, ECC RAMs and parity on data paths).

In an embodiment, the management circuit is configured to operate at a higher level of fault protection at all times by using an "always on" fault detection mechanism for the management circuit (by subjecting the management circuit to fault detection monitoring at all times).

This is in an embodiment done using a dual core lockstep arrangement (by the management circuit being configured to operate in, and being operated in, dual core lockstep at all times). In other words, the management circuit is in an embodiment instanced twice (there are two identical instances of the management circuit), with one instance of the management circuit being used to check (monitor) the operation of the other instance of the management circuit at all times (and with any discrepancy between them being taken as an indication of a fault).

Other safety (protection) mechanisms that can provide a (suitably) high level of fault protection at all times, could, of course, be used, if desired.

In the case where the management circuit is protected by fault detection monitoring, then the management circuit and the system is in an embodiment configured to take (appropriate) action in the event of a fault (or threshold level of faults, for example) being detected. This could comprise, for example, the management circuit performing some form of error recovery operation, and/or reporting the fault to another component of the system, such as the controller, for handling. In an embodiment some action is taken to protect against the consequences of the detected fault(s)

In the event of a fault, some or all of the system may, e.g., be reset, and/or the system may enter a particular, e.g. preset, "safe" mode of operation. The operation in the event of a fault being detected may, e.g., be specified for the data processing system in question (e.g. there may be a predefined fault recovery operation), and/or able to be set in use.

As well as the management circuit being configured to operate at a higher level of fault protection at all times, the control of the management circuit to configure the processing units, etc., into groups, by the controller is also in an embodiment configured to be done (and done) in an appropriately "fault protected" manner (at all times).

Thus, the processor executing the controller for the management circuit (and their associated communications path) in an embodiment together form, and are operated as, a "high fault protection" domain of the data processing system, for which a higher level of fault protection is maintained at all times.

Although the management circuit is operated at a higher level of fault protection at all times, as discussed above the groups of processing units that the processing units are divided into can in an embodiment be configured to operate in different fault protection modes, namely (at least) at a higher level or lower level of fault protection.

A group of processing units can be operated at a higher or at a lower level of fault protection in any suitable and desired manner. Again, this is in an embodiment achieved by protecting the groups of processing units using an appropriate fault protection mechanism or mechanisms (at least in the case where they are to operate with a higher level of fault protection). For example there could be two (or more) levels (modes) of protection that could be used, with the level of protection to be used being selected and set accordingly.

In an embodiment, the system supports the use of a fault protection (and in an embodiment fault detection) mechanism to protect the groups of processing units with a higher level of fault protection, which fault protection (e.g. detection) mechanism can be (and is) used (is enabled) when a group of processing units is to be operated with a higher level of fault protection (but which fault protection (e.g. detection) mechanism can be (and is) not used (is disabled) when a group of processing units is to be operated with a lower level of fault protection).

Thus, in an embodiment, the groups of processing units are protected by a fault protection (in an embodiment fault detection) mechanism that may be selectively used and not-used according to the desired fault protection requirements.

Any suitable fault protection mechanism that may be selectively enabled and disabled (in operation) may be used in this regard.

In an embodiment, a fault detection mechanism that may be selectively enabled and disabled (applied or not applied) for a group of processing units is used to provide the different levels of fault protection for the groups of processing units.

It would be possible to also protect the processing units using dual core lockstep arrangements, but only operate the duplicated instances of a given processing unit in a manner such that the operation is being fault-checked (protected) when a higher level of fault protection is required. In the case of the lower level of fault protection, the duplicated instances of a given processing unit could, and in an embodiment would, instead be operated to execute different operations (and thereby support the performance of the system, but not perform a fault protection function).

In an embodiment, the fault protection mechanism that is used for the groups of processing units comprise a mechanism that does not require duplication of the processing units (like dual core lockstep would), but rather is a fault protection mechanism that requires only a single instance of each processing unit.

In an embodiment, the configurable fault protection mechanism that is used to protect the groups of processing units (when required to operate at a higher level of fault protection) comprises (explicitly) performing fault detection testing of the processing units of the group, in an embodiment using one or both of: built-in self-testing (BIST); and software test library (STL) testing. In this case, the fault protection mechanism (e.g. BIST and STL) would be performed when the higher level of fault protection is required, but would not be performed when the lower level of fault protection is desired.

Thus, in an embodiment, respective groups of the processing units can be selectively operated with either a higher level of fault protection or a lower level of fault protection by being able to be subjected to a fault detection testing process when in use or not (and can, correspondingly, be subjected to a fault detection testing process that can be selectively applied to and used for a group of processing units).

Correspondingly, the operating of a group of processing units with a higher level of fault protection or a lower level of fault protection in an embodiment comprises subjecting the group of processing units to a fault detection test in use or not.

Similarly, in an embodiment the data processing system supports the use of, and comprises a mechanism for, fault detection testing the groups of processing units, and that fault detection testing can be selectively applied to the groups of processing units.

Other arrangements would, of course, be possible.

The higher level of fault protection that is used for a group of processing units (where that is done) can be any suitable and desired level of fault protection (that is higher than the lower level of fault protection that the processing units can be selectively operated at). In an embodiment it is a level of fault protection that is suitable for desired safety-critical operation in the data processing system in question, e.g., and in an embodiment, that meets a particular "safety" standard (certification) (e.g. that may be defined for the intended use of the data processing system), such as a specified automotive safety standard. It may be the same level of fault protection or a lower level of fault protection than is applied to the management circuit. (Thus there may be a first, "highest" level of fault protection that is applied to the management circuit, and a second, middle level and third, lowest level of fault protection that can be selectively applied to the groups of processing units.)

It should also be noted here that while in these embodiments of the technology described herein, groups of processing units may be selectively subjected to higher or lower levels of fault protection operation (testing), that does not mean that a group that is to operate with a lower level of fault protection, for example, would not be subjected to any form of fault protection in use. Rather, these embodiments of the technology described herein are concerned with providing a selectively settable and enablable level of fault protection for the groups of processing units, as between a higher level of fault protection and a lower level of fault protection, but do not preclude there being some (other) form of "always on" fault protection mechanism for the groups of processing units in any event.

It will be appreciated from the above, that in embodiments of the technology described herein at least, the management circuit always operating with a higher level of fault protection comprises subjecting the management circuit to fault detection monitoring at all times (while in operation), and selectively operating the groups of the processing units with either of at least two modes of fault protection, where one mode has a higher level of fault protection than the other mode, comprises selectively subjecting the groups of processing units to fault detection testing.

Correspondingly, a further embodiment of the technology described herein comprises a data processing system comprising:
 a plurality of processing units;
 a management circuit associated with the processing units and operable to configure the processing units of the plurality of processing units into respective groups of the processing units, wherein each group of processing units comprises a set of one or more of the processing units of the plurality of processing units;
 wherein
 the management circuit is configured to be subjected to fault detection monitoring at all times while in operation; and
 groups of the processing units can be selectively subjected to fault detection testing in use.

A further embodiment of the present comprises a method of operating a data processing system, the data processing system comprising:
 a plurality of processing units; and
 a management circuit associated with the processing units and operable to configure the processing units of the plurality of processing units into respective groups of the processing units, wherein each group of processing units comprises a set of one or more of the processing units of the plurality of processing units;

the method comprising:

the management circuit configuring the plurality of processing units into at least two groups of processing units;

monitoring the operation of the management circuit for the presence of faults when the management circuit is in operation; and subjecting at least one of the groups of the processing units to fault detection testing whilst the group of processing units is in operation, but for another of the groups of the processing units, not subjecting that group of processing units to fault detection testing whilst in operation.

As will be appreciated by those skilled in the art, these embodiments of the technology described herein can, and in an embodiment do, include any one or more or all of the features of the technology described herein discussed herein, as appropriate.

Whether a group of the processing units is to operate with a higher level of fault protection or a lower level of fault protection can be selected in any suitable and desired manner, and on any suitable and desired basis.

In an embodiment, this is based on whether the group of processing units is to be used for a "domain" that requires a higher level of fault protection (such as a "safety-critical" domain) or not (with the group of processing units being operated with the higher level of fault protection in the case where it is to be allocated to such a domain, but operated with a lower level of fault protection in the case where the group of processing units is not to be allocated to such a domain).

Thus, where the data processing system comprises (at least) two processors (or processor clusters), including at least one processor (cluster) which is configured to operate in a safety critical manner and that executes, inter alia, a group of one or more safety critical virtual machines, any group of processing units that is allocated to the safety-critical processor is in an embodiment configured to operate at a higher level of fault protection (e.g. has BIST enabled) (and any group of processing units that is not (that is other than) allocated to a safety-critical processor is configured to operate at a lower level of fault protection (e.g. does not have BIST enabled)).

Correspondingly, in the case where, as discussed above, the graphics processing system comprises a plurality of communication buses, then any group of processing units that is allocated to a communications path (bus) intended for "safety critical" (secure) communications (traffic) is in an embodiment operated with a higher level of fault protection, and vice-versa.

A group of processing units that is to be operated with a higher level of fault protection can be configured to operate with the higher level of fault protection in any suitable and desired manner. For example, the management circuit associated with the processing units may support the appropriate fault detection testing, and so the controller can configure the groups such that that fault detection testing supported by the management circuit is enabled for the group.

In an embodiment, and as will be discussed further below, the fault protection (in an embodiment detection testing) for a group of processing units is performed under the control of the arbiter for the group of processing units, and so configuring a group of graphics processing units to be operated with the higher level of protection comprises allocating that group of processing units to an arbiter that will cause the higher level of fault protection (e.g. detection testing) for the group of processing units (and correspondingly controlling the arbiter to, e.g. cause the fault detection testing to be performed for the group of processing units).

In an embodiment, respective arbiters of the system are configured either to perform or to not perform fault protection (and in an embodiment detection testing) for a group of processing units that they have been allocated, and so a group of processing units will be caused to operate with a higher level of fault protection by assigning that group of processing units to an arbiter that is configured to cause the appropriate fault detection testing to be performed for a group of processing units that it is allocated.

In this case therefore, there will be one or more arbiters that support and perform fault protection (detection testing) of groups of processing units, and one or more other arbiters that do not support (nor perform) fault protection (detection testing) of a group of processing units, and a group of processing units will be configured to be operated at a higher level of fault protection by assigning it to an arbiter that performs the fault detection testing, and a group of processing units will be configured to be operated with a lower level of fault protection by assigning it to an arbiter that does not support the fault detection testing.

In this case, and in an embodiment, an arbiter that is executing on a processor (e.g. a processor cluster) that executes virtual machines for which fault detection testing is desired (e.g. safety critical virtual machines) is in an embodiment correspondingly configured to support and perform fault detection testing for a group of processing units, and so any group of processing units that is assigned to serve those virtual machines (that processor) would correspondingly be operated at a higher level of fault protection.

Correspondingly, and in an embodiment, there may be one or more arbiters for processors that execute virtual machines that do not require a higher level of fault protection, and so those arbiters will be configured not to perform fault detection testing of a group of processing units, and any group of processing units allocated to such an arbiter will accordingly be operated at a lower level of fault protection.

Thus in an embodiment, the allocation of the groups of processing units to respective arbiters correspondingly also sets whether the group of processing units will be subjected to a higher or lower level of fault protection. Thus in embodiments the controller will set the level of fault protection to be used for a group of processing units by virtue of the arbiter that it causes the group to be assigned to.

Once the groups of processing units have been configured, and allocated to respective arbiters, etc., then any group of processing units that is to be operated at the lower level of fault protection will be operated without the fault protection (detection testing) in question being performed for the group of processing units.

On the other hand, when a group of processing units is to be operated with a higher level of fault protection, then the corresponding fault detection testing (e.g. BIST) (or other fault protection mechanism) should be, and is in an embodiment, performed for the group of processing units (while the group of processing units is in use by a group of virtual machines).

In this case, the, e.g., fault detection testing (e.g. built-in self-testing) for the group of processing units can be triggered and performed in any suitable and desired manner. This may, e.g., and in an embodiment, depend upon the form of fault protection (e.g. detection testing) that is being used.

As discussed above, in an embodiment, the arbiter for the group of processing units controls the fault detection testing of the group of processing units. Thus for a group of processing units that is to be operated at the higher level of fault protection, the arbiter for that group of processing units in an embodiment causes the group of processing units to be subjected to the appropriate fault detection testing for that. To facilitate this, the management circuit in an embodiment includes an appropriate testing configuration interface (e.g. registers) that can be set by the arbiter to trigger the fault detection testing for a group of processing units.

In an embodiment, the fault detection testing for a group of graphics processing units can be triggered and performed on a partition-by-partition basis. Thus the arbiter is in an embodiment able to and operates to cause respective partitions of the group of processing units to be subjected to the fault detection testing.

In an embodiment, each processing unit can be, and is, subjected to the fault detection testing on its own, and independently of any other processing units of the group. This is advantageous, because, as discussed above, in embodiments at least, processing units can be moved between groups, and so being able to configure the fault detection testing at the level (at the resolution of) the individual processing units supports that operation.

Thus in an embodiment, the fault detection testing can be triggered and performed for individual processing units on their own, and independently of the testing of any other processing unit. Correspondingly, the management circuit in an embodiment comprises for each processing unit, an appropriate testing control interface that can be used by an arbiter to trigger fault detection testing of the processing unit.

In an embodiment, the testing is done such that each of the processing units in the group is (fully) tested at least once within a desired (fault detection) testing interval (diagnostic test interval) (as may, e.g., be specified for the data processing system, and, e.g., the "safety critical" domain, in question) (for the processing unit in question). Thus, in an embodiment, the fault detection testing for a group of processing units that is to be operated at a higher level of fault protection is performed such that all of the processing units in the group undergo fault detection testing within a particular, in an embodiment selected, in an embodiment predefined, testing interval (time period). The (diagnostic) test interval may the same for all the processing units/partitions or different processing units/partitions may have different (diagnostic) test intervals.

The fault detection testing may (otherwise) be done as desired. For example, some or all of the processing units/partitions could be tested at the same time, or different processing units/partitions could be tested at different times (i.e. such that not all of the processing units in the group are being tested at the same time).

In one embodiment, the arbiter in an embodiment triggers fault detection testing for a partition of the processing units (and on a partition-by-partition basis), with the system then operating when a partition is triggered for fault detection testing, to test all of the processing units of the partition (but in an embodiment independently of each other).

The actual testing of the processing units (and partitions) of a group can be performed as desired. In one embodiment, any given processing unit or partition that is to be tested is made unavailable to any virtual machines for processing operations, then tested, and then returned to being available for use by virtual machines for processing operations (assuming that the testing is passed).

Thus the arbiter is in an embodiment operable to, and operates to, when a partition and/or processing unit is to be tested, remove the partition and/or processing unit from being accessed by any virtual machine, cause the partition and/or processing unit to be fault detection tested, and then re-enable the partition and/or processing unit for use by a virtual machine (and will, e.g., then take a next partition and/or processing unit, if any, out of service and test that partition, and so on).

In this case, depending upon how the fault detection testing is performed, a partition/processing unit may be taken "offline" (put in a different hardware state, unavailable to software) while being tested (e.g. in the case of built-in self-testing (BIST)), or a partition/processing unit under test may remain in its "mission mode" hardware state whilst executing the operations designed to test its function, but would not be available for normal operation (for "mission mode" software) (as it will be executing non-mission mode software for the testing) (e.g. in the case of STL (software test library) testing).

The actual fault detection testing of a, e.g. processing unit can be performed by any suitable and desired testing element (circuit) of the data processing system. In an embodiment, the data processing system correspondingly includes appropriate testing circuits (a testing unit) for this purpose. These testing circuits need not be, and in an embodiment are not, part of the management circuit and/or the processing units themselves, but are otherwise provided as part of the data processing system. Thus the operation in the manner of the technology described herein to perform fault detection testing for, e.g., a processing unit, will comprise the management circuit (in an embodiment under the control of the arbiter) triggering the appropriate testing of a, e.g., processing unit, but the testing itself will be performed by a separate testing circuit of the data processing system (e.g. an appropriately configured BIST unit of the data processing system).

Where a group of processing units is being subject to the fault detection testing (e.g. BIST), then if the processing unit, partition, etc. (as appropriate) passes the fault detection testing (which can be determined and set in any suitable and desired manner), then the processing unit, etc., can remain operating in its normal manner.

On the other hand, if the processing unit, partition, etc. (as appropriate) fails the fault detection testing, then an (appropriate) fault detection event action is in an embodiment performed. This may be done, e.g., by the management circuit, and/or by the test circuit (unit). Again, this could comprise, for example, performing some form of error recovery operation, and/or reporting the fault to another component of the system, such as the controller, for handling. Again, this in an embodiment comprises taking action to protect against the consequences of the detected fault(s).

In the event of a fault, the processing unit and/or partition may, e.g., be reset, and/or may enter a particular, e.g. preset, "safe" mode of operation. The operation in the event of fault detection testing being failed may, e.g., be specified for the data processing system in question (e.g. there may be a predefined fault recovery operation), and/or able to be set in use.

In an embodiment, the management circuit is operable to and operates to configure the fault protection and detection settings (operation), such as one or more, and in an embodiment all, of: enabling the desired fault protection (e.g. detection) mechanisms; enabling fault protection (detection) for the desired groups, partitions and/or graphics processing units; and configuring the behaviour in the event of a fault (e.g. whether fault reporting is enabled or disabled, the current operation should be terminated or continued, etc.). This is in an embodiment done under the control of the controller, and the management circuit in an embodiment includes an appropriate communications (control) interface, such as a set of registers, and that is, e.g., accessible only to the controller, for this purpose.

As well as being able to operate respective groups of the processing units with a higher or lower level of fault protection, as discussed above, in an embodiment the configuration and operation of the data processing system includes further features to (help to) ensure appropriate hardware separation between groups of processing units having different levels of fault protection, and as between different fault protection domains in general.

Thus, in an embodiment, the management circuit is always powered on (and may only be powered off under the control of the (privileged) controller). On the other hand, the respective groups of processing units are in an embodiment able to be powered on and off as required by the management circuit. That is in an embodiment able to be done, and is in an embodiment done, by and under the control of the arbiter for the group of processing units. In an embodiment individual partitions of a group of processing units can be independently powered on and off and/or individual processing units within a group of processing units can be powered on and off.

Correspondingly, in an embodiment, the management circuit is able to reset a (and each) group of processing units independently of any of the other groups of processing units. Again, this is in an embodiment under the control of the arbiter for the group of processing units in question. In an embodiment, individual partitions within a group can be reset independently of other partitions in the group, and/or individual processing units in a group can be reset independently of the other processing units in the group.

There is in an embodiment also a reset that can be applied to the management circuit, which can in an embodiment be triggered by (and only by) the (privileged) controller. In an embodiment, there are two levels of "reset" that can be applied to the management circuit, a first level of reset that resets all hardware, and a second level of reset (a recovery reset) that resets all hardware except for error reporting mechanisms (which may, e.g., be used when an error recovery requires a reset (e.g. because a unit is unresponsive)).

In an embodiment, each processor (processor cluster) of the data processing system, such as the "controller" processor, and processors executing an arbiter and virtual machines, has its own, independent interrupt. Correspondingly, each of the different fault protection domains (e.g. safety domains) in an embodiment has its own, separate interrupt.

In an embodiment, both the management circuit, and the groups of processing units, can independently and separately generate interrupts. In an embodiment, each partition of the processing units can generate its own, independent interrupt. In an embodiment, any interrupt is broadcast to all of the processors (processor clusters) of the system, with the corresponding interrupt controller for each processor (processor cluster) identifying whether the broadcast interrupt applies to it (e.g. is for a partition of a group of processing units that is under its ownership) or not.

It will be appreciated from the above, that the technology described herein, in its embodiments at least, supports and provides a data processing system that supports the provision of different fault protection domains and the separation of the processing units, etc. into different protection level domains.

This is done, inter alia, by assigning processing resources to different, and independent, communications paths (buses), assigning different identifiers to transactions issued by bus masters (which can then be used to restrict access to data in memory, and, e.g., can be used to indicate quality of service requirements), providing independent interrupts for routing to the different domains, providing independent resets for hardware resources that may be in different domains, and providing independent power controls for hardware resources that may be in different domains, and providing independent, and selectively applyable, fault detection testing.

The subdivision of the processing resources into different and isolated domains is further protected by only permitting resources to be moved between different domains under the control of an appropriately privileged (system) controller and by preventing resources in one group from being able to be used by virtual machines that are accessing another group (except in the case where the groups are reconfigured by the privileged controller). This is facilitated by providing appropriate interfaces to control the allocation and configuration of the resources into the groups, and the access to the processing resources within the groups, such that those communications interfaces (e.g. registers) can only be accessed by processors, the controller, arbiters and virtual machines that are permitted to do that (that have the appropriate permissions).

This all then facilitates, for example, assigning groups of processing units to different, e.g. safety, domains, such as a safety-critical and a non-safety critical domain (and keeping those domains isolated from each other).

Correspondingly, the system will be, and is in an embodiment, operated to assign a group of graphics processing resources (partitions, processing units and access windows) that is to be used for a safety critical domain to a corresponding safety critical communications path (bus) and safety-critical processor (processor cluster) (assuming that the system-on-chip architecture has pre-assigned a processor (processor cluster) and bus to be safety critical), and to subject that group of processing resources for the safety critical domain to appropriate fault detection testing (e.g. BIST) while it is operating, and correspondingly to assign a group of processing resources that is to be used for a non-safety critical domain to a corresponding non-safety critical communications path (bus) and non-safety-critical processor (processor cluster), and to not subject that group of processing resources for the non-safety critical domain to the fault detection testing (e.g. BIST) while it is operating.

Subject to the requirement to be operable in accordance with the technology described herein, the processing units of the data processing system may otherwise comprise any or all of the normal components, functional units, and elements, etc., that such a processing unit may comprise. Each processing unit may have the same set of functional units, etc., or some or all of the processing units may differ from each other.

Thus, in the case of graphics processing units, for example, each graphics processing unit in an embodiment includes one or more execution units, such as one or more shader (programmable processing) cores. In an embodiment, each graphics processing unit includes a plurality of shader cores, such as three or four shader cores.

In an embodiment, the graphics processing units (and thus the graphics processing system) are tile-based graphics processing units, and one or more of (e.g. all of) the graphics processing units also includes a tiling unit (a tiler or hierarchical tiler).

Some or all of the graphics processing units in an embodiment also comprise one or more of, and in an embodiment all of: a management unit (e.g. a job manager) that provides the virtual machine (software) interface for the graphics processing unit and is also operable to divide a data processing task allocated to the graphics processing unit into subtasks and to distribute the subtasks for execution to the execution unit or units of the graphics processing unit; a cache (e.g. a level 2 cache) that provides an interface to an external (main) system memory of the data processing system, and a memory management unit (MMU) (however, appropriate memory management units could also or instead be located externally to the graphics processing unit or units, if desired).

Each graphics processing unit will also comprise an appropriate communications network for providing communications between the various units of the graphics processing unit, such as memory transactions between execution units and/or the cache of the graphics processing unit, subtask control traffic between the job manager and execution units and so on.

Other configurations of graphics processing unit would, of course, be possible.

As well as the processing units, controller, arbiters, virtual machines (and their host processors), etc., necessary for operation in the manner of the technology described herein, the data processing system may otherwise include any other suitable and desired components, elements, units, etc., that a data processing system may comprise.

Thus, the data processing system may, e.g., include one or more peripheral devices, such as one or more output devices (e.g. display screens, vehicle controllers, etc.), and/or one or more input devices (e.g. human-computer interfaces, vehicle sensors, etc.). The virtual machines (host processors) may have access to the same set of one or more peripheral devices, or, e.g., a separate set of peripheral devices may be provided for different groups of virtual machines (again, this may be beneficial for safety and/or security purposes).

The overall data processing system in an embodiment includes appropriate (system) memory for storing the data used by the processing units when carrying out processing and/or for storing the data generated by the processing units as a result of carrying out processing. Different groups of processing units may be configured to be connected to the same (system) memory, or separate system memories may be provided for different groups (again, this may be beneficial for safety and/or security purposes).

Correspondingly, different groups of the processing units may be connected to the external system memory via the same or different memory interconnects.

Thus, in an embodiment, the data processing system includes the processing units, and one or more host data processing units (processors) (e.g. central processing units) on which one or more virtual machines execute (in an embodiment together with one or more drivers (for the processing units)).

In an embodiment, the data processing system and/or data processing units comprise, and/or are in communication with, one or more memories and/or memory devices that store the data described herein, and/or that store software for performing the processes described herein.

The technology described herein can be used for all forms of output that data processing units may output. Thus, in the case of graphics processing units, it may be used when generating frames for display, render-to-texture outputs, etc. However, the technology described herein can equally be used where the graphics processing units are to be used to provide other processing and operations and outputs, for example that may not be or may not relate to a display or images. For example, the technology described herein can equally be used for non-graphics use cases such as ADAS (Advanced Driver Assistance Systems) which may not have a display and which may deal with input data (e.g. sensor data, such as radar data) and/or output data (e.g. vehicle control data) which isn't related to images. In general, the technology described herein can be used for any desired graphics processor data processing operations, such as GPGPU (general purpose GPU) operations.

In one embodiment, the various functions of the technology described herein are carried out on a single system on chip (SoC) data processing system.

The technology described herein can be implemented in any suitable system, such as a suitably operable microprocessor based system. In some embodiments, the technology described herein is implemented in a computer and/or micro-processor based system.

The various functions of the technology described herein can be carried out in any desired and suitable manner. For example, the functions of the technology described herein can be implemented in hardware or software, as desired. Thus, for example, the various functional elements, stages, units, and "means" of the technology described herein may comprise a suitable processor or processors, controller or controllers, functional units, circuitry, circuits, processing logic, microprocessor arrangements, etc., that are operable to perform the various functions, etc., such as appropriately dedicated hardware elements (processing circuits/circuitry) and/or programmable hardware elements (processing circuits/circuitry) that can be programmed to operate in the desired manner.

It should also be noted here that the various functions, etc., of the technology described herein may be duplicated and/or carried out in parallel on a given processor. Equally, the various processing stages may share processing circuits/circuitry, etc., if desired.

Furthermore, any one or more or all of the processing stages or units of the technology described herein may be embodied as processing stage or unit circuits/circuitry, e.g., in the form of one or more fixed-function units (hardware) (processing circuits/circuitry), and/or in the form of programmable processing circuitry that can be programmed to perform the desired operation. Equally, any one or more of the processing stages or units and processing stage or unit circuits/circuitry of the technology described herein may be provided as a separate circuit element to any one or more of the other processing stages or units or processing stage or unit circuits/circuitry, and/or any one or more or all of the processing stages or units and processing stage or unit circuits/circuitry may be at least partially formed of shared processing circuit/circuitry.

It will also be appreciated by those skilled in the art that all of the described embodiments of the technology described herein can include, as appropriate, any one or more or all of the features described herein.

The methods in accordance with the technology described herein may be implemented at least partially using software e.g. computer programs. Thus, further embodiments of the technology described herein comprise computer software specifically adapted to carry out the methods herein described when installed on one or more data processors, a computer program element comprising computer software code portions for performing the methods herein described when the program element is run on one or more data processors, and a computer program comprising code adapted to perform all the steps of a method or of the methods herein described when the program is run on a data processing system. The data processing system may be a microprocessor, a programmable FPGA (Field Programmable Gate Array), etc.

The technology described herein also extends to a computer software carrier comprising such software which when used to operate a graphics processor, renderer or other system comprising one or more data processors causes in conjunction with said data processor(s) said processor, renderer or system to carry out the steps of the methods of the technology described herein. Such a computer software carrier could be a physical storage medium such as a ROM chip, CD ROM, RAM, flash memory, or disk, or could be a signal such as an electronic signal over wires, an optical signal or a radio signal such as to a satellite or the like.

It will further be appreciated that not all steps of the methods of the technology described herein need be carried out by computer software and thus further embodiments of the technology described herein comprise computer software and such software installed on a computer software carrier for carrying out at least one of the steps of the methods set out herein.

The technology described herein may accordingly suitably be embodied as a computer program product for use with a computer system. Such an implementation may comprise a series of computer readable instructions fixed on a tangible, non-transitory medium, such as a computer readable medium, for example, diskette, CD ROM, ROM, RAM, flash memory, or hard disk. It could also comprise a series of computer readable instructions transmittable to a computer system, via a modem or other interface device, over a tangible medium, including but not limited to optical or analogue communications lines, or intangibly using wireless techniques, including but not limited to microwave, infrared or other transmission techniques. The series of computer readable instructions embodies all or part of the functionality previously described herein.

Those skilled in the art will appreciate that such computer readable instructions can be written in a number of programming languages for use with many computer architectures or operating systems. Further, such instructions may be stored using any memory technology, present or future, including but not limited to, semiconductor, magnetic, or optical, or transmitted using any communications technology, present or future, including but not limited to optical, infrared, or microwave. It is contemplated that such a computer program product may be distributed as a removable medium with accompanying printed or electronic documentation, for example, shrink wrapped software, pre-loaded with a computer system, for example, on a system ROM or fixed disk, or distributed from a server or electronic bulletin board over a network, for example, the Internet or World Wide Web.

A number of embodiments of the technology described herein will now be described.

FIG. 1 shows an embodiment of a data processing system that is in accordance with the technology described herein, in the form of an automotive system-on-chip (SoC).

As shown in FIG. 1, the data processing system 1 of this embodiment comprises three CPU (central processing unit) clusters: a first "quality managed" (QM) cluster 2, comprising a CPU 3 running "quality managed" software (thus the CPU 3 does not have automotive safety features); a second, "ASIL" (automotive safety integrity level) (functional safety, FuSa) cluster 4, comprising a CPU 5, but this time running appropriately safety certified software; and a "safety island" cluster 6, comprising a CPU 7 that runs safety certified software for configuration of the system and fault handling.

As shown in FIG. 1, each CPU cluster also comprises its own general interrupt controller (GIC) 8, 9, 21.

As well as the CPU clusters, the system also comprises a "graphics processing" cluster 10, comprising a set 11 of graphics processing units ("slices"), that are able, as will be discussed further below, to provide processing functions to virtual machines executing on the QM cluster 2 and the ASIL cluster 4.

In this example, the set 11 of graphics processing units comprises eight graphics processing units (slices 0-7, where each slice is a graphics processing unit of the set), but other numbers of graphics processing units would, of course, be possible. As will be discussed further below, in this embodiment the graphics processing units (GPUs) can be operated in various modes, namely either as "standalone" GPUs, or as one or more linked sets of a primary (master) and one or more secondary (slave) GPUs.

The graphics processing units 11 also have associated with them (as part of the graphics processing cluster 10), a management circuit (partition manager) 12.

As shown in FIG. 1, the system supports three separate communications bus connections for the graphics processing cluster 10: a first communications bus 18 that may be used, for example, for non-safety critical traffic and thus by the QM cluster 2; a second bus 19 that may be a safety-critical/secure bus and used, for example, for safety critical traffic and thus by the ASIL cluster 4; and a third bus 20 that may be a safety-critical/secure bus but that also has privilege restrictions (i.e. can only be accessed by appropriately privileged bus masters) and that is used for configuration communications only by the safety island 6.

The system also includes an appropriate system cache 13, DRAM controller 14, interconnects 15, 16 and a system memory management unit (sMMU) 17 (that, e.g., provides second level address translation separating safe and non-safe address spaces and isolates the memory access for each virtual machine based on the per-access window stream IDs) for the graphics processing cluster 10.

There may, of course, be functional units, processors, system elements and components etc., that are not shown in FIG. 1.

The management circuit (partition manager) 12 for the graphics processing units 11 is operable to configure and set a configurable communications network that sets the communications paths between the different graphics processing units (slices) 11, and also how the (and which) graphics processing units communicate with the QM cluster 2 and the ASIL cluster 4 (and in particular which of the buses 18, 19, can be used to communicate with the respective graphics processing units). In particular, it can set that communications network to configure the graphics processing units (slices) 11 into, in this embodiment, two different groups of the graphics processing units, one group for the QM cluster 2 (and coupled to the bus 18 for that cluster), and one group for the ASIL cluster 4 (and coupled to the bus 19 for that cluster).

As well as being able to set the configurable communications network to subdivide the graphics processing units into different groups, the management circuit (partition manager) also supports and can configure the organisation of the graphics processing units of a group into one or more independently allocatable partitions (subsets) of the graphics processing units (slices) of the group.

The management circuit (partition manager) 12 also provides a set of "access windows" in the form of communications interfaces whereby a virtual machine may access and control a given partition of the graphics processing units. Each such access window comprises, in the present embodiments, a set of (communication) registers having a corresponding set of physical addresses that can be used to address those registers.

These access windows also provide the mechanism whereby a virtual machine may communicate with an arbiter (with the arbiter for the group of graphics processing units that the virtual machine is to used), and in particular provide a mechanism for a virtual machine and arbiter to exchange messages, for example in relation to the virtual machine requesting processing resources, and the arbiter controlling access of the virtual machine to the (partitions of) processing units, for example to signal when the access window is enabled to use a partition, and/or when the virtual machine is to relinquish its use of a partition, e.g. so as to permit a different virtual machine to access the partition. The virtual machine-arbiter interface is separate to the virtual machine-graphics processing unit partition interface.

Thus, the graphics processing cluster 10 effectively provides a set of graphics processing resources, comprising the graphics processing units (slices) 11, and the partitions and access windows supported by the management circuit 12, which resources can be subdivided into plural (in the present embodiment two) graphics processing resource "groups", each containing one or more of the graphics processing units (slices) and having associated with them one or more of the independently allocatable partitions of the graphics processing units and one or more "access windows".

In the present embodiment, the management circuit (partition manager) 12 supports the subdivision of the graphics processing units 11 into two different groups (one for use by the QM cluster 2, and the other for use by the ASIL cluster 4), into a maximum of four partitions, and provides a set of 16 access windows for virtual machines to communicate with the partitions of the graphics processing units. Other arrangements would, of course, be possible.

In the present embodiments, and in accordance with the technology described herein, the configuration of these graphics processing resources into the respective groups is done by the management circuit (partition manager) 12 under the control of a (privileged) controller executing on the safety island 6, and respective arbiters executing on the QM cluster 2 and the ASIL cluster 4.

To support this operation, the management circuit (partition manager) 12 further comprises appropriate configuration interfaces, e.g., and in an embodiment, in the form of appropriate sets of configuration registers, that can be respectively accessed and set by the controller on the safety island 6 and the arbiters on the CPU clusters. The controller and arbiters can correspondingly set their configuration registers accordingly, to thereby control the management circuit (partition manager) 12 to configure the graphics processing resources (and in particular the configurable communications network that configures the graphics processing resources) accordingly. The management circuit (partition manager) 12 may also include one or more state machines for this purpose.

Figure 2:
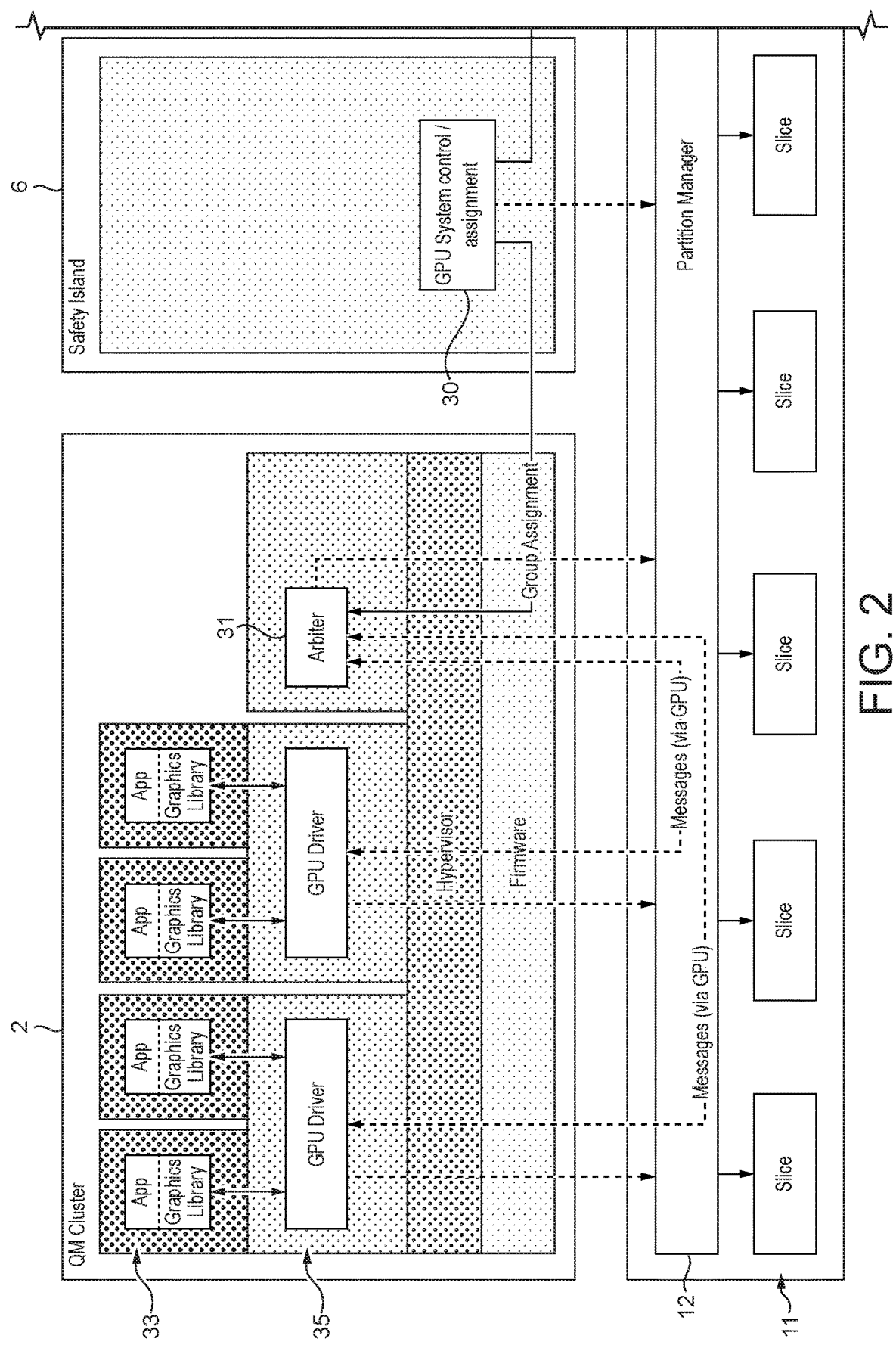
FIG. 2 shows schematically further details of the data processing system of FIG. 1.
Figure 2:
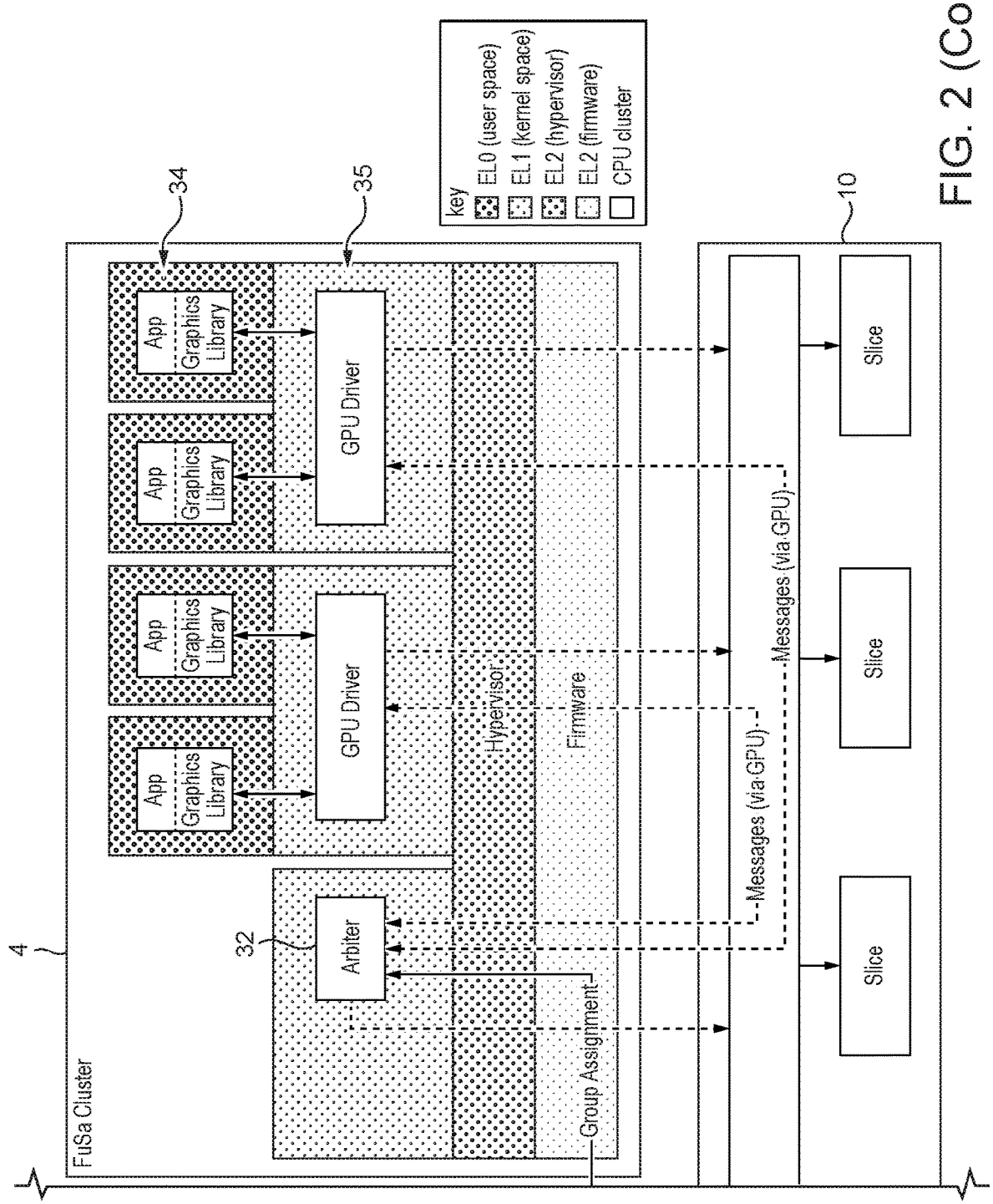

FIG. 2 illustrates this, and shows the QM cluster 2, ASIL (FuSa) cluster 4, and safety island 6, together with a (privileged) system controller 30 executing on the safety island 6, an arbiter 31 executing on the QM cluster 2, and an arbiter 32 executing on the ASIL (FuSa) cluster 4.

The arbiters 31, 32 are operable to control access by virtual machines executing on the cluster in question to the corresponding graphics processing resource group that has been allocated to that cluster. The arbiter 32 for the ASIL cluster 4 is configured to operate in and supports operation in an appropriate safety critical manner. The arbiter 31 for the QM cluster does not need to be configured to operate and support safety critical operation.

Each arbiter may operate in association with a corresponding hypervisor for managing the operation of virtual machines that is executing on the cluster in question (but is separate to the hypervisor).

FIG. 2 also shows a corresponding set of virtual machines 33 executing on the QM cluster 2, and a set of virtual machines 34 executing on the ASIL cluster 4. In this example, it is assumed that there are two virtual machines executing on each cluster, although other arrangements would, of course, be possible. Each cluster correspondingly executes an appropriate graphics processing unit (GPU) driver 35 for each virtual machine that it supports.

FIG. 2 also shows the corresponding communications links between the controller 30 and arbiters 31, 32, and from the controller 30 and arbiters 31, 32 and virtual machines 33, 34 (via the drivers 35) to the management circuit (partition manager) 12 of the graphics processing unit cluster 10.

The controller 30 is able to assign to each "resource group" that it configures, one or more graphics processing units of the set of graphics processing units 10, one or more of the partitions that the partition manager 11 supports, and one or more of the access windows that the partition manager supports. Each group is also assigned to a respective one of the "cluster" communication buses 18 and 19, in dependence upon whether the group is to be used by the QM cluster 2 (in which case it will be assigned to the corresponding QM cluster bus 18) or by the ASIL cluster 4 (in which case it will be assigned to the ASIL bus 19).

In order to configure the respective groups of graphics processing resources that are to be made available to the QM cluster 2 and ASIL cluster 4, the controller on the safety island 6 sets appropriate configuration parameters in the (privilege-restricted) configuration registers of the management circuit (partition manager) 12, in response to which the management circuit 12 configures the communications network for the graphics processing unit (slices) 11 accordingly. As shown in FIGS. 1 and 2, the controller 30 communicates with the management circuit (partition manager) 12 directly, via the restricted configuration bus 20.

Figure 3:
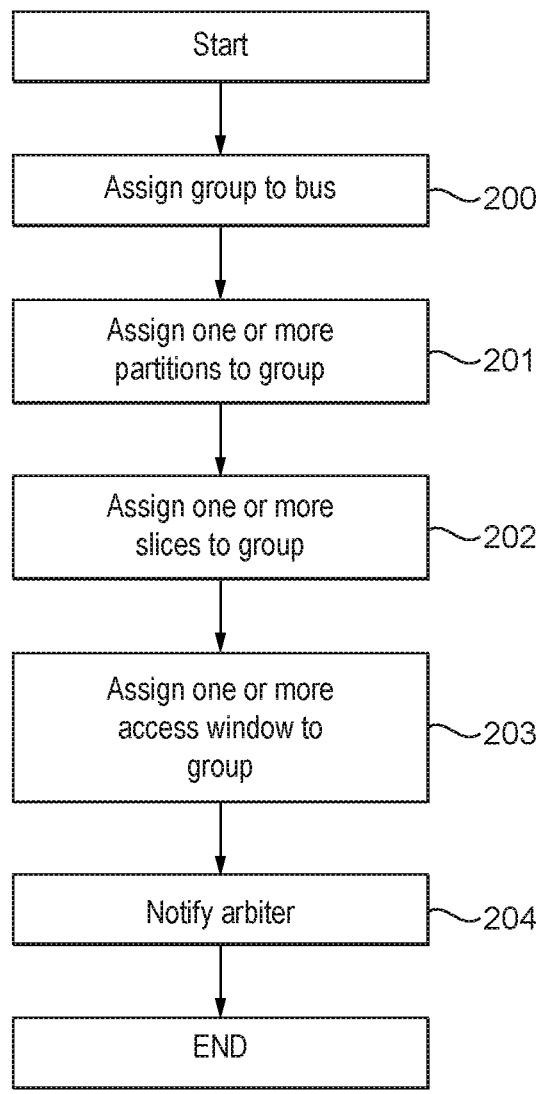
FIG. 3 shows the operation of the controller when configuring a graphics processing resource group in an embodiment of the technology described herein.

FIG. 3 shows the operation of the controller 30 on the safety island 6 when forming a graphics processing resource group in the present embodiment.

As shown in FIG. 3, the controller 30 will first assign the group to the bus that is to be used to communicate with the group (step 200). This is done using an appropriate bus assignment message (PTM_RESOURCE_GROUP_BUS).

The controller 30 will then assign the partitions that are to be allocated to the group (step 201). Again, this is done using an appropriate assignment message (PTM_PARTITION_RESOURCE_GROUP).

The controller then assigns the individual graphics processing units (slices) to the group (step 202). Again, this is done using an appropriate assignment message (PTM_SLICE_RESOURCE_GROUP).

The controller 30 then assigns the access windows for the group (step 203). Again, this is done with an appropriate assignment message (PTM_AWRESOURCE_GROUP). As part of this process, each access window is also assigned a protected and not protected memory transaction identifier (stream ID), which can be used to tag each memory (DRAM) transaction for the access window in question appropriately. Again, this is done using appropriate assignment messages (PTM_AW0_STREAM_ID and PTM_AW0_PROTECTED_STREAM_ID).

The corresponding arbiter for the group may then be notified of its group assignment (step 204).

This notification is in an embodiment done through the safety island CPU (cluster) controlling the boot process of the CPU clusters. As shown in FIG. 2, the group assignment notification to the arbiter may, e.g., proceed via the firmware and an appropriate hypervisor executing on the cluster in question. (There may not, e.g., be a "run-time" notification message at all, with the group assignment being statically encoded in the firmware or hypervisor.)

The information conveyed is in an embodiment to the hypervisor of the clusters to assign access windows and configuration interfaces to virtual machines, and informing the virtual machines of this. The arbiter (the virtual machine containing the arbiter) will also be told the addresses of the configuration interfaces of the partitions it controls.

Thus, the virtual machines that are associated with the arbiter (i.e. that are executing on the corresponding CPU cluster) are correspondingly each assigned one of the access windows that has been assigned to the group for the arbiter. This may be done, for example, by the hypervisor when it initialises the virtual machines.

This process will be repeated by the controller 30 for each group of the graphics processing units that is to be configured (so in the present embodiment, this will be done to form two groups of the graphics processing units, one "safety" group for use by the ASIL cluster 4, and one "non-safety" group for use by the QM cluster 2, with each group comprising a respective set of one or more of the graphics processing units, a set of one or more of the partitions supported by the partition manager 12, a set of one or more of the access windows supported by the partition manager 12, and the appropriate one of the buses 18, 19, to be used to communicate with the CPU clusters).

(It would, of course, be possible to form more than two such graphics processing resource groups, if desired, e.g. where there are more than two CPU clusters in the system.)

The actual subdivision of the graphics processing units (slices), partitions and access windows as between the different groups of graphics processing units can be determined and selected as desired, for example based on the expected (graphics) processing requirements for the different clusters that the groups are to be configured for. The controller 30 can reconfigure the groups in use (e.g. if there is a change in the usage requirements for the different clusters).

Once the arbiter for a cluster has been notified of its group assignment, then the arbiter completes the configuration of the resources of the group, so that they can then be made available for use by virtual machines.

Again, to do this, the arbiter sends appropriate messages to the management circuit (partition manager) 12 to set a set of configuration registers that are provided as a configuration interface for the arbiter in question, to control the management circuit (partition manager) 12 to configure the group of graphics processing resources accordingly. As shown in FIG. 2, the arbiters communicate directly with the management circuit (partition manager) 12 (over the bus that is assigned to the group in question (the hypervisor restricts/separates the access using the CPU level-2 MMU)).

Figure 4:
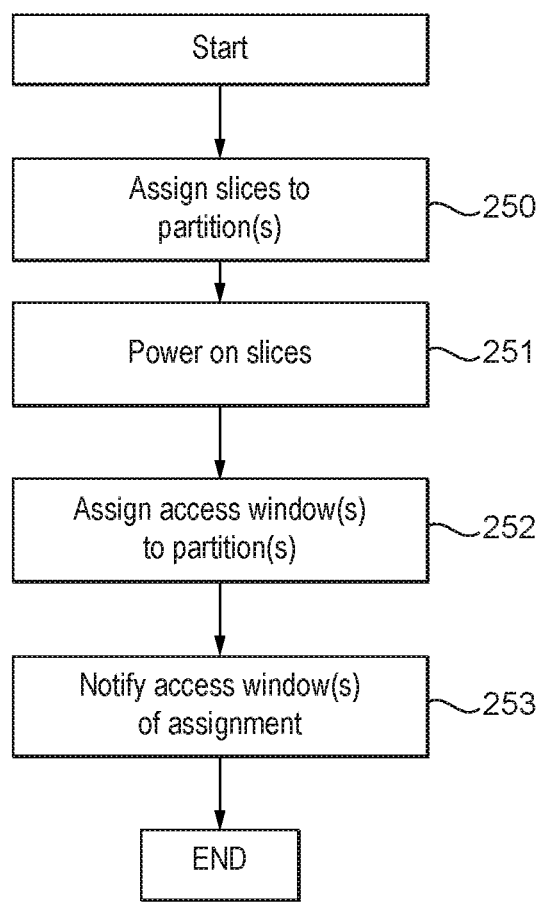
FIG. 4 shows the operation of an arbiter when configuring a graphics processing resource group in an embodiment of the technology described herein.

FIG. 4 shows the operation of an arbiter when configuring its graphics processing resource group so that it can then be made available for use by virtual machines (in the present embodiment executing on the CPU cluster that the arbiter is executing on).

As shown in FIG. 4, the arbiter will first operate to assign the graphics processing units (slices) allocated to its group to the partitions that have been allocated to the group (step 250). Depending on the number of partitions and graphics processing units in its group, the arbiter can configure respective partitions to comprise a single graphics processing unit (slice) (that will then operate in a standalone mode) or a linked set of plural graphics processing units (slices) (comprising a primary (master) graphics processing unit and one or more secondary (slave) graphics processing units).

The arbiter will then power on the graphics processing units (slices) (step 251).

The arbiter will then assign one of the access windows for the group to each partition in the group (step 252), and notify the corresponding virtual machine whose access window has been allocated to a partition of that assignment, so that the virtual machine can start to use the partition (step 253). This is done via the message passing interface (registers) of the access window that provides the communications path between the arbiter and the virtual machine.

In the present embodiments, as well as the arbiter being able to assign slices to partitions and access windows to partitions when the group is initially configured, the arbiter can also change the assignment of slices and access windows to partitions in use.

Figure 5:
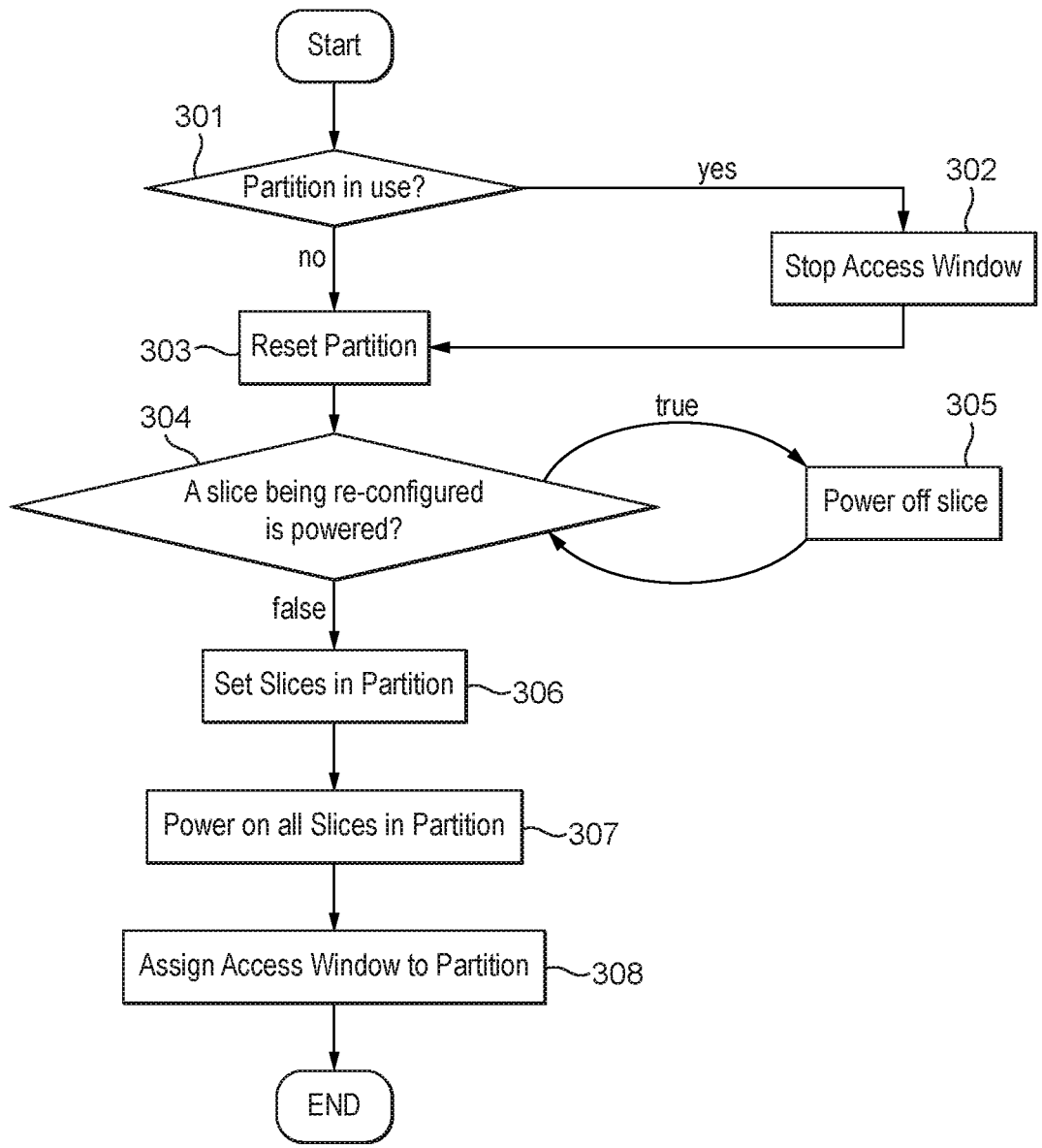
FIG. 5 shows the operation of an arbiter when configuring a graphics processing unit partition in an embodiment of the technology described herein.

FIG. 5 shows the operation of the arbiter when assigning graphics processing units (slices) to a partition in more detail.

FIG. 5 shows the operation that would be carried out when initially configuring the group of graphics processing resources, and also how the operation will proceed in the case where it is desired to reconfigure one or more partitions of a group while the partitions are in use.

As shown in FIG. 5, the arbiter for a group will first determine whether a partition that it wishes to configure is in use (step 301). If so, it will first stop the access to that partition by an access window (step 302). This may involve, for example, an appropriate software handshake with the virtual machine that is using the partition to allow the processing for the virtual machine to be stopped appropriately before the partition is reconfigured.

Once the partition is no longer in use (or if it was not in use), then the partition is reset (step 303).

(The reset should ensure that no state or data from the previously assigned access window/virtual machine is left in the graphics processing units of the partition, so as to ensure isolation of the virtual machines. While this may also be accomplished by the powering off of the graphics processing units (slices), the partition reset also ensures that the access window is de-assigned from the partition so it can no longer access it while the graphics processing units (slices) are reassigned.

To further facilitate this operation, the system operates such that assigning an access window to a partition "locks" the partition such that it cannot be modified, and a partition can only be "unlocked" by resetting it. Thus a reset is necessary to unlock a partition and only after that can a partition be reconfigured, a new access window enabled for it, etc. This should then ensure that no data or state is left behind in the partition from one access window to another.)

It is then determined whether any graphics processing unit that is to be allocated to or from the partition is currently powered (step 304). If so, the graphics processing unit (slice) is powered off (step 305).

Once all the graphics processing units (slices) have been powered off, then the partition including the graphics processing units can be configured accordingly (step 306) and the graphics processing units (slices) in the partition powered on for use (step 307).

An access window may then be assigned to the partition to allow it to be accessed by a virtual machine (step 308).

This operation as shown in FIG. 5 will be performed for each partition that a group supports, to configure the partitions for the group accordingly (and may, as discussed above, be repeated in use, e.g. where it is desired to reconfigure the partitions of a group in use).

In the present embodiments, the arbiter for a group of graphics processing resources may reconfigure the partitions for its group and the resources within its group to partitions at any time. However, the arbiter cannot access graphics processing resources within a different group, and may not move graphics processing resources between groups. This then ensures that the arbiters cannot move graphics processing resources between the groups, thus cannot move graphics processing resources between different, e.g., safety, domains.

Figure 6:
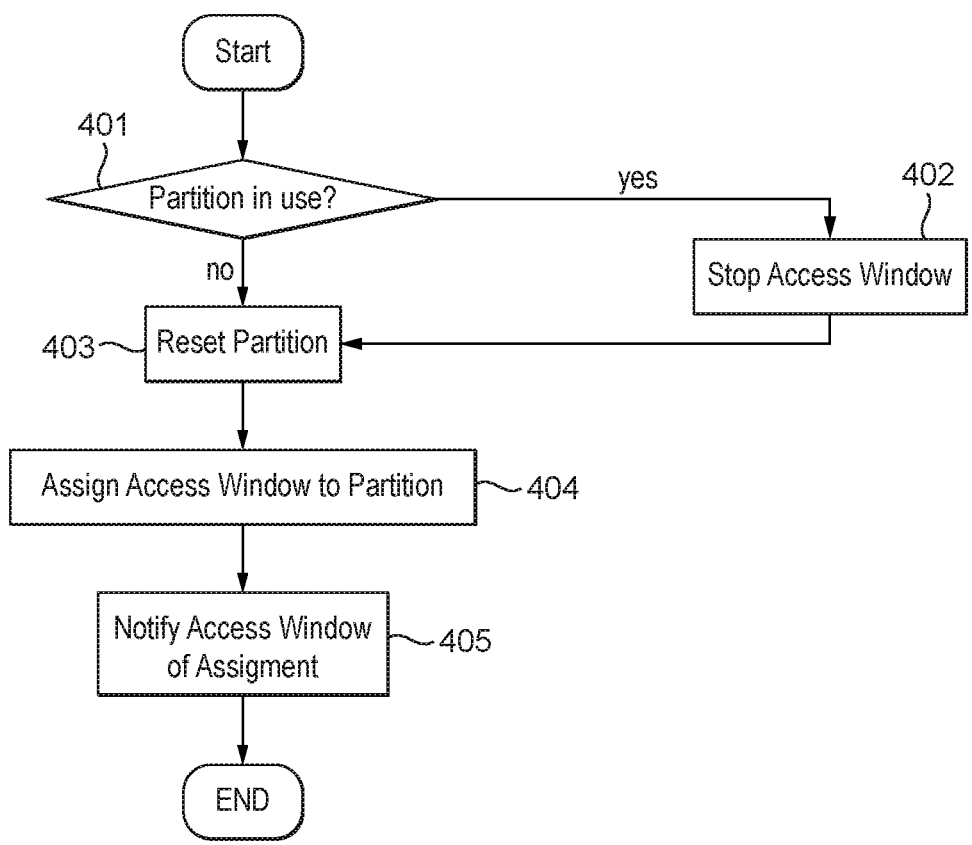
FIG. 6 shows the operation of an arbiter when assigning an access window to a partition in an embodiment of the technology described herein.

FIG. 6 correspondingly shows the operation of an arbiter to assign, and e.g. change, the access window that has access to a given partition, so as to control the access by different virtual machines to the partition. This may be, for example, in response to a request for graphics processing resources by a virtual machine.

As shown in FIG. 6, the arbiter will first determine whether the partition that it wishes to assign to a virtual machine is currently in use (step 401). If so, then the arbiter will appropriately stop the existing access window that is using the partition (step 402). Again, this may involve an appropriate "handshaking" procedure with the virtual machine that is currently using the partition, so as to allow the processing for that virtual machine to be stopped in an appropriate manner.

If (or once) the partition is not in use, then the partition is reset (step 403).

A new (different) access window is then assigned to the partition (step 404). To do this, the arbiter enables the communications interface (set of registers) that the new access window corresponds to for communication with and control of the partition of the graphics processing units (slices) in question, by setting the management circuit (partition manager) to configure that accordingly (e.g. by setting a "status" register accordingly).

The virtual machine that the access window corresponds to is then notified accordingly (step 405) (via the message passing register(s) of the access window). The virtual machine that corresponds to the new access window may then access and use the partition. To do this, the virtual machine will use its access window to address the registers of the communications interface corresponding to its access window, to thereby set those registers and communicate with the partition of the graphics processing units, to use the partition to perform the desired processing tasks. As shown in FIG. 2, this will be done via a driver for the graphics processing units that is associated with the virtual machine.

The operation shown in FIG. 6 will be used by arbiter when it wishes to allow a different virtual machine to access a partition, and may take place, for example, multiple times per frame for a given partition, to thereby allow several virtual machines to share that partition in a time divided manner (using time-slicing).

Figure 7:
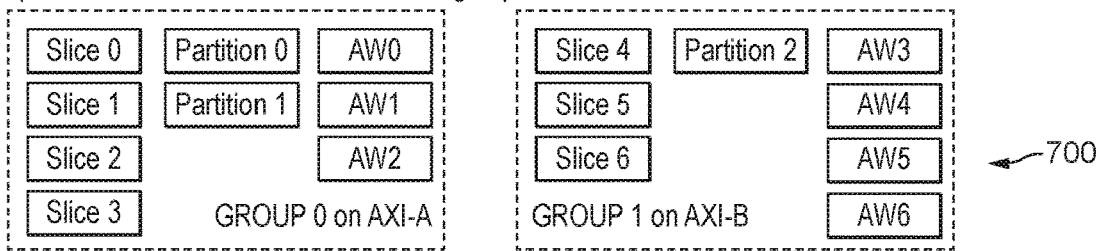
FIG. 7 shows the overall operation in an embodiment of the technology described herein.
Figure 7:
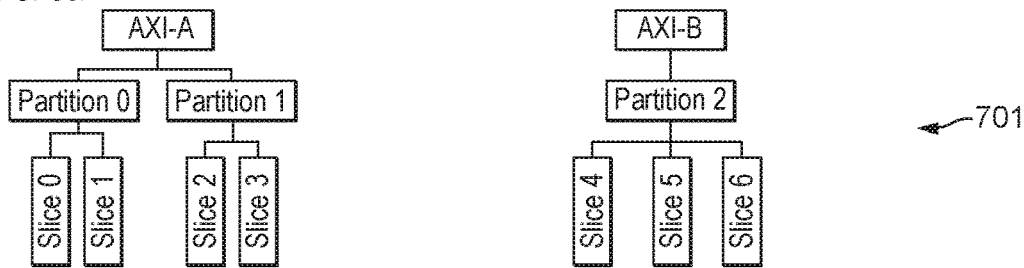
Figure 7:
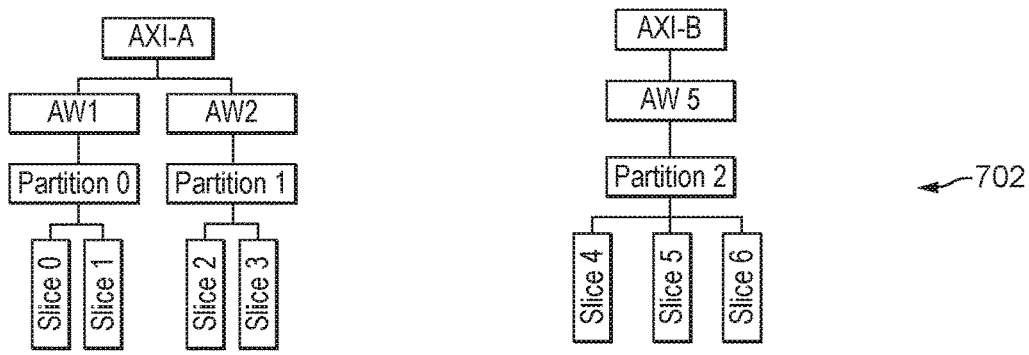
Figure 7:
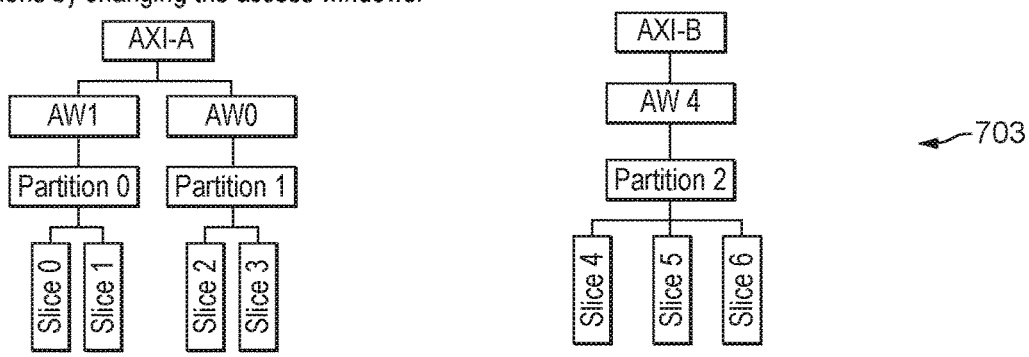

FIG. 7 shows an example of the above operation of the controller 30 and the arbiters 31, 32 to configure graphics processing resource groups, and then enable different virtual machines to access the partitions of a given resource group.

Thus, as shown in FIG. 7, the controller 30 will first assign each graphics processing resource group to a bus, and then add graphics processing units (slices), partitions, and access windows to each group (step 700).

The arbiter for each respective group will then assign the graphics processing units (slices) for the group into partitions for the group, to create, in effect, independently allocatable and addressable graphics processing unit partitions (step 701). The arbiter will then enable an access window for each partition to allow a driver (and thus virtual machine) to access it (step 702).

The arbiter for a group may then change the access windows for the partitions, to allow different drivers (and thus virtual machines) to take turns using the partitions of the group (step 703).

As discussed above, in the present embodiments, the arbiter for a group of graphics processing units is unable to move graphics processing resources between the different groups of graphics processing resources that are configured by the controller 30.

However, in the present embodiments, the controller 30 is able to move graphics processing resources between the groups in use.

Figure 8:
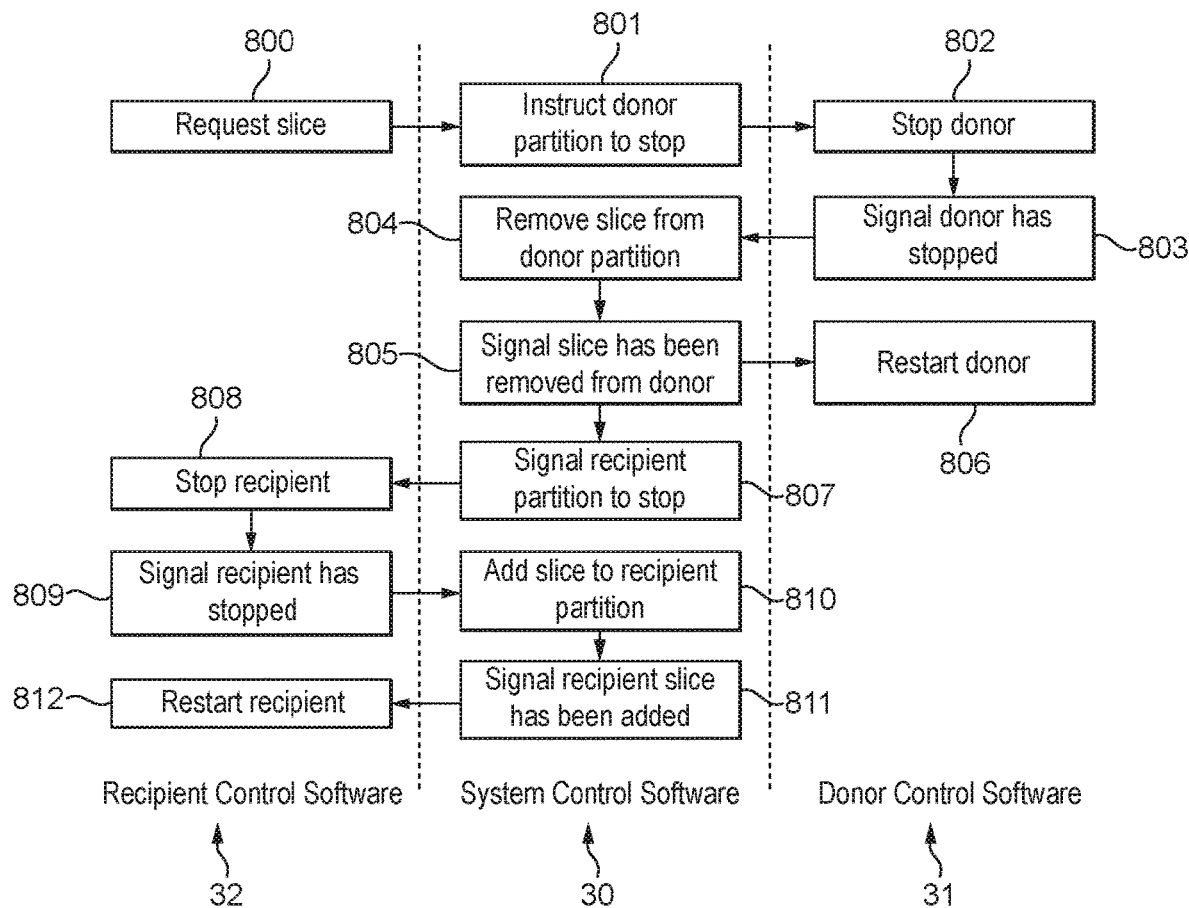
FIG. 8 shows the reconfiguring of a graphics processing resource group in an embodiment of the technology described herein.

FIG. 8 illustrates this operation and shows the moving of a graphics processing unit (slice) from one group to another, e.g. causing it also to change safety domain. In FIG. 8, the donor is the group losing the graphics processing unit (slice), and the recipient is the group gaining the graphics processing unit (slice).

In this example of graphics processing unit being transferred between groups, it may be assumed, for example, that the arbiter 32 for the ASIL cluster 4 makes a request for a further graphics processing unit (step 800). In response to this, the controller 30 will instruct the arbiter 31 for the QM cluster 2 (which is where the graphics processing unit is to be transferred from) to stop the partition from which the graphics processing unit is to be transferred (step 801). In response to this instruction, the arbiter 31 for the QM cluster (in this example) will stop the relevant partition and signal that to the controller 30 (steps 802 and 803).

The controller 30 will then operate via the partition manager 12 to remove the graphics processing unit (slice) in question from the group assigned to the QM cluster (step 804) and inform the arbiter 31 for the QM cluster accordingly (step 805).

The arbiter 31 for the QM cluster may then restart its partition accordingly (step 806).

The controller 30 will also correspondingly signal the arbiter 32 for the ASIL cluster to stop the partition that is to receive the additional graphics processing unit (step 807).

In response to this, the arbiter for the ASIL cluster 4 will stop the partition that is to receive the additional graphics processing unit (step 808), and when that is done, signal the controller 30 accordingly (step 809).

In response to this, the controller 30 will add the graphics processing unit to the partition in the group for the ASIL cluster (step 810) and signal to the arbiter 32 for the ASIL cluster that that has been done (step 811).

The arbiter 32 for the ASIL cluster may then restart the partition which will now have an additional graphics processing unit (step 812).

Figure 9:
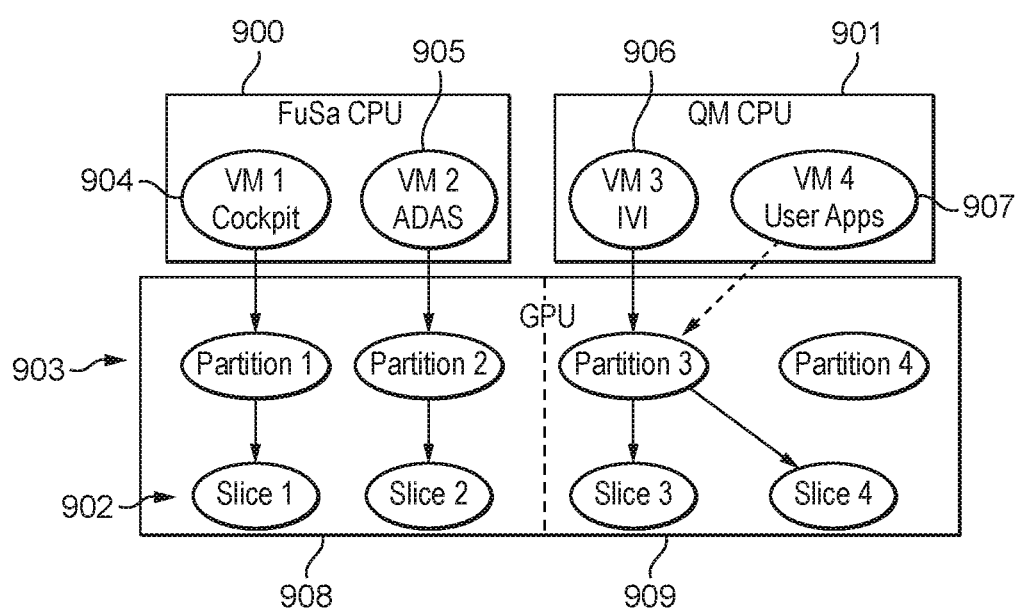
FIG. 9 shows schematically a data processing system in another embodiment of the technology described herein.
Figure 10:
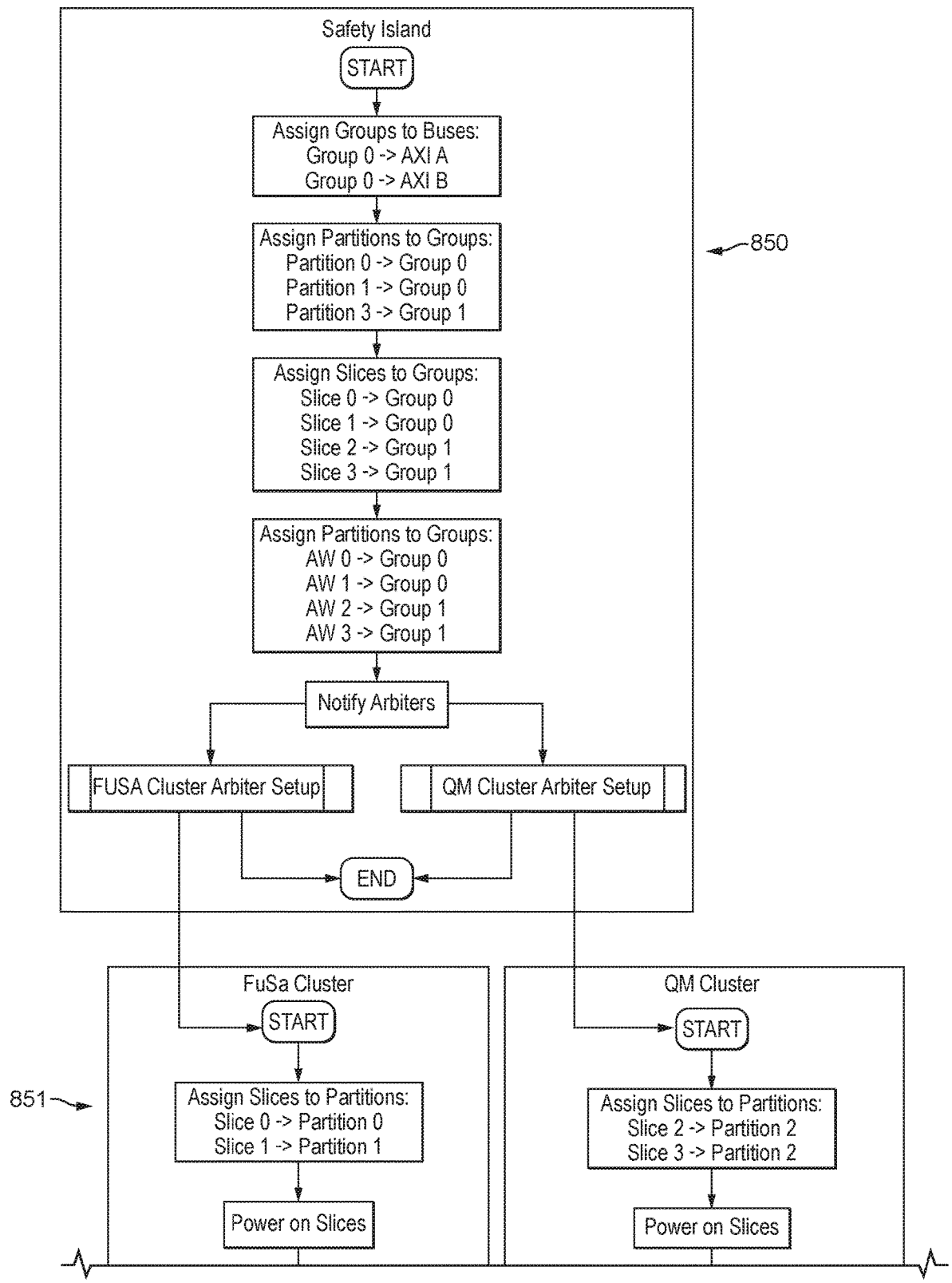
FIG. 10 shows the operation of the controller and arbiters in the data processing system of FIG. 9.
Figure 10:
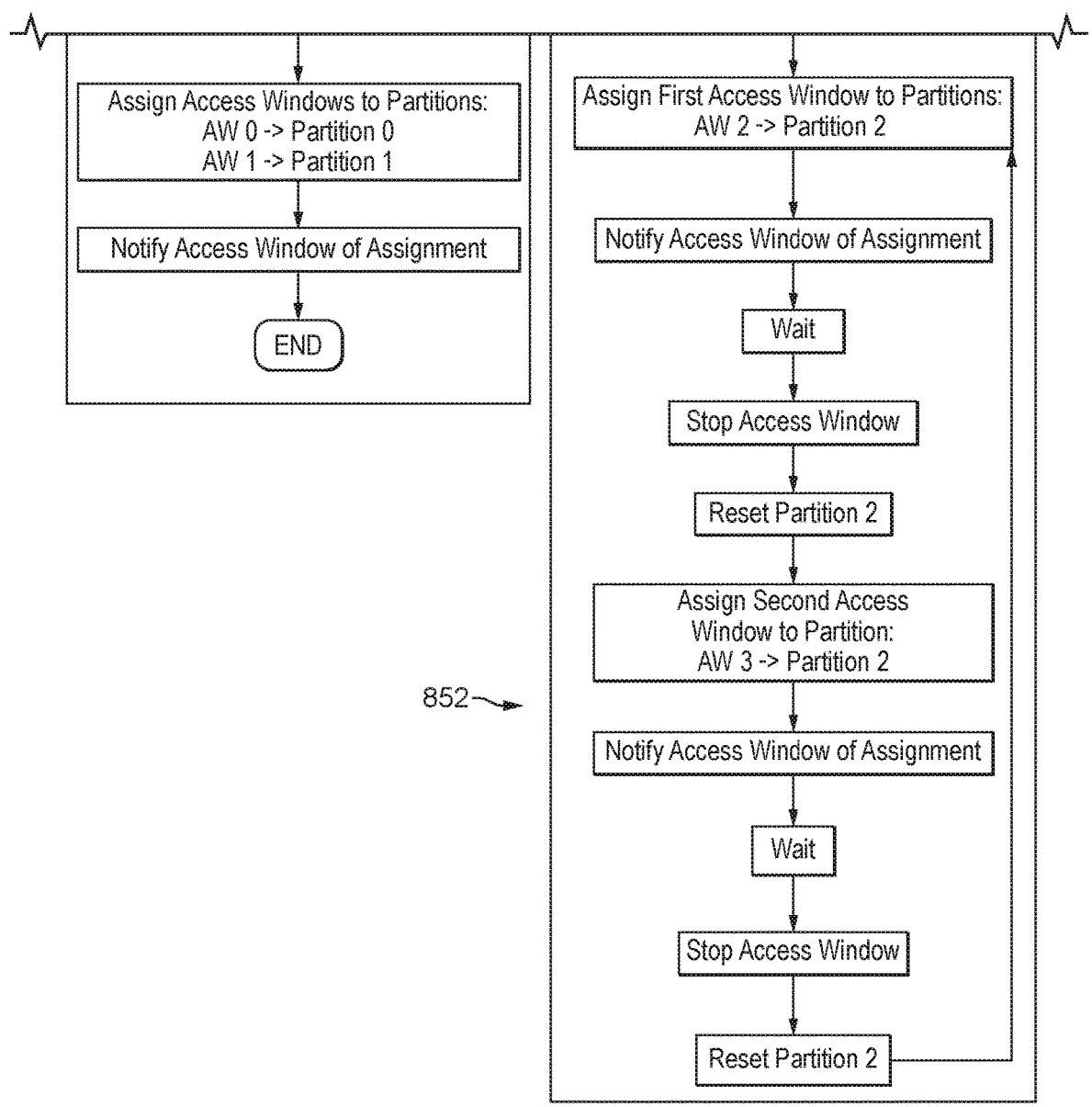

FIGS. 9 and 10 show an embodiment of allocating graphics processing resources to groups for an exemplary automotive system-on-chip (SoC) that is intended for both safety critical and non-safety critical applications, and that accordingly has a dedicated ASIL (FuSa) CPU cluster 900 for functional safety applications, and a dedicated CPU cluster 901 for quality managed (QM) applications.

In this case, it is assumed that the available graphics processing resources comprise a set of four graphics processing units (slices) 902, and that these can be assigned across four resource groups, four partitions 903, and sixteen access windows.

The automotive system-on-chip in this embodiment is intended to be used for the following uses: rendering the digital cockpit 904 (which is a functional safety operation), as part of an advanced driver assistance systems (ADAS) computation pipeline 905 (which is again a functional safety operation); controlling and rendering the in-car infotainment (IVI) system 906; and enabling the execution of user-installed applications 907.

In this embodiment, it is assumed that each of these use cases will be isolated in separate virtual machines, to minimise faults in one affecting the other. The rendering of the digital cockpit and the advanced driver assistance system's computation pipeline are safety critical, and so will execute on the functional safety CPU cluster 900. The controlling and rendering of the in-car infotainment system and the enabling of the execution of used-installed applications will execute on the QM cluster 901.

In this embodiment, in order to provide guaranteed quality of service, each of the functional safety virtual machines is assigned a dedicated partition of one graphics processing unit (slice) each. These will not be shared with any other virtual machines.

The remaining two graphics processing units (slices) of the system-on-chip will be shared by the QM cluster virtual machines. As the complexity of the workloads across those two virtual machines may vary depending on the use by the end user, a flexible sharing of those resources is configured. Thus the two remaining graphics processing units (slices) are configured as a single partition that includes both the graphics processing units of that group, that will then be reassigned between the two virtual machines as required.

FIG. 9 illustrates this, and shows the four graphics processing units (slices) divided into two groups, with the first, functional safety group 908 comprising two partitions of one slice each, and the second, quality managed group 909 comprising one partition of two graphics processing units (slices). The groups are correspondingly associated with the functional safety cluster or the quality managed cluster, with the virtual machines in the functional safety cluster 900 being allocated a partition each, but the virtual machines in the quality managed cluster 901 sharing the single partition in the quality managed group 900, in a time divided manner.

FIG. 10 is a corresponding flowchart showing the operation 850 of the controller, the operation 851 of the functional safety (ASIL) cluster arbiter and the operation 802 of the QM cluster arbiter 852 in this embodiment.

As discussed above, the graphics processing units (slices) 11 are able to be linked to each other. This allows a graphics processing unit to optionally be linked up with another graphics processing unit or units (in a partition) to work cooperatively on a given task. The task routing and GPU link mechanism is implemented in hardware and is substantially transparent to the virtual machines running on the CPU clusters, such that the graphics processing units can appear as the same single graphics processing unit to a virtual machine, regardless of the particular graphics processing unit configuration being used. This allows the graphics processing unit resources to be used in many different situations, either with separate graphics processing units for respective virtual machines, or with plural graphics processing units linked to execute functions with higher performance for a single virtual machine.

In the present embodiments, the graphics processing units can operate in a standalone mode, a master mode, or a slave mode. In standalone mode, a graphics processing unit operates independently under direct control from a virtual machine. In master mode, the graphics processing unit controls one or more other graphics processing units operating in slave mode, and provides the software interface (the virtual machine interface) for the linked set of graphics processing units. In slave mode, the graphics processing unit operates under control of a master graphics processing unit.

Figure 11:
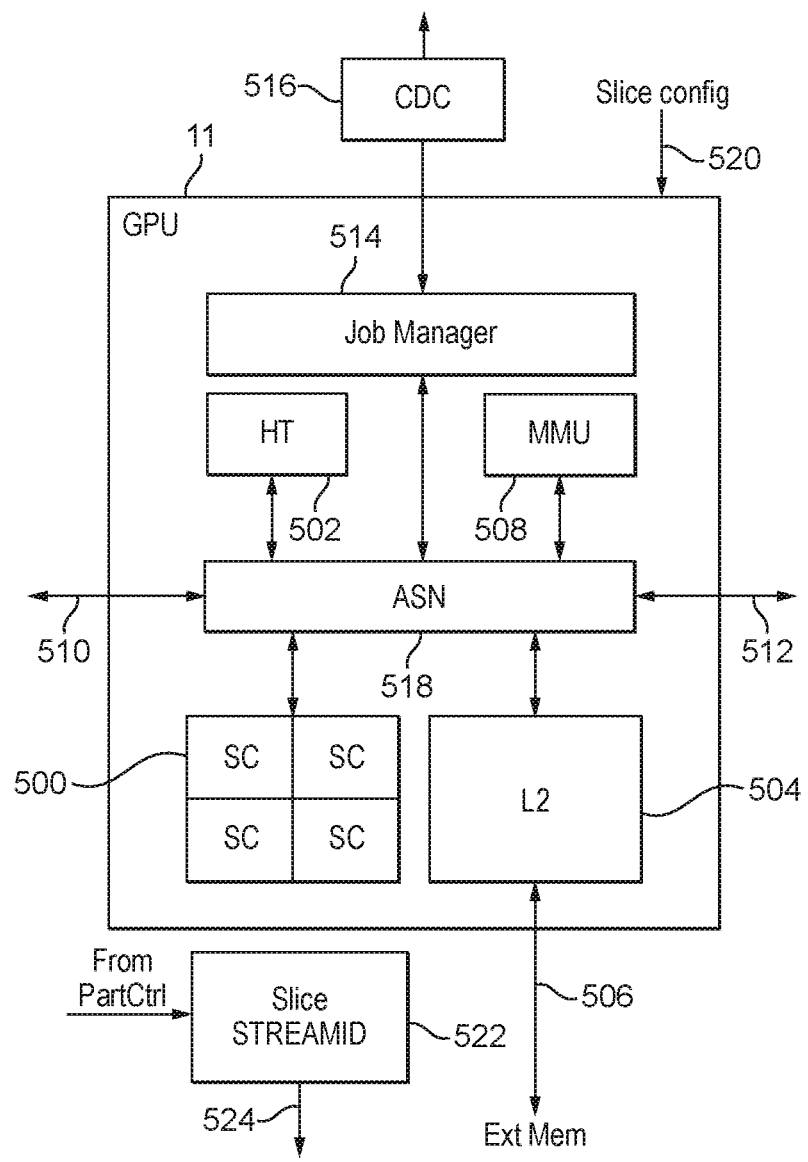
FIG. 11 shows schematically and in more detail components of a graphics processing unit in an embodiment of the technology described herein.

FIG. 11 shows in more detail the arrangement and components of each graphics processing unit (slice) 11 in the embodiments of the technology described herein.

As shown in FIG. 11, in this embodiment, each graphics processing unit (slice) comprises one or more execution units, such as programmable processing (shader) cores 500 (SC) and a hierarchical tiler 502 (HT). In this embodiment, each graphics processing unit is tile-based. Different graphics processing units 11 may have different sets of execution units, and there are more possible types of execution units than those shown in FIG. 11.

Each graphics processing unit also includes a level 2 cache 504 (L2) that inputs data to be used in the data processing tasks and outputs the resultant output data via a cache interface 506. The cache interface 506 is connected to external system memory 116 via a suitable memory interconnect. The graphics processing units may also include a memory management unit (MMU) 508, but this may also or instead be located externally to the graphics processing units.

Each graphics processing unit 11 also includes one or more communication bridges comprising a slave bridge 510 for connecting to a master graphics processing unit (the master graphics processing unit may be connected directly, or through a daisy-chain of other slave graphics processing units), and/or a master bridge 512 for connecting to slave graphics processing units. The master bridge 512 is used in master mode to connect one or more slave graphics processing units (through daisy-chaining), and may also be used in slave mode to connect further daisy-chained slave graphics processing units.

In the present embodiments, the communication bridges 510, 512 are implemented to support an asynchronous interface between graphics processing units, as this allows easier physical implementation of the graphics processing units as the clock can then be independent when the graphics processing units are linked.

Each graphics processing unit also includes a job manager 514. This provides the software interface for the graphics processing unit 11, and thus receives via a task interface 516 tasks (commands and data) for a virtual machine from a driver running on CPU cluster in question, and divides a task given by the driver into subtasks and distributes the subtasks for execution to the various execution units (shader cores 500, tiler 502) of the graphics processing unit. Where a graphics processing unit 11 is able to operate as a master, the job manager 514 is configured to also be able to control execution units of linked slave graphics processing units. Correspondingly, for a graphics processing unit 11 that is able to operate as a slave, the job manager 514 is able to be disabled when the graphics processing unit is operating in slave mode.

As shown in FIG. 11, the various functional units, etc., of each graphics processing unit are connected to each other via an asynchronous communications interconnect 518 that carries various traffic such as memory transactions between execution units and the level 2 cache 504 (L2), subtask control traffic between the job manager 514 and execution units, and so on. As shown in FIG. 11, the asynchronous interconnect 518 also connects to the respective slave and master bridges 510, 512 of the graphics processing unit 11 and includes appropriate switches (not shown) that can be activated to enable or disable communication across (via) the bridges 510, 512 to a connected graphics processing unit.

The different operating modes of the graphics processing unit (standalone, master and slave modes) are set (enabled and disabled) by configuring the routing of the asynchronous interconnect 518 appropriately. Thus, for example, when the graphics processing unit is to operate in standalone mode, the slave and master bridges 510, 512 are disabled to prevent communication via (across) the bridges. Correspondingly, when a graphics processing unit is to act as a master, the master bridge 512 is enabled to allow communication with a connected graphics processing unit. Correspondingly, when a graphics processing unit is to act as a slave, the slave bridge 510 is enabled to allow communication with a connected graphics processing unit.

In the present embodiments, the asynchronous interconnect 518 is reconfigured by the management circuit (partition manager) 12 through a configuration interface 520 of the graphics processing unit 11. Any routing configuration (or reconfiguration) in an embodiment only happens during reset of the graphics processing unit.

Each graphics processing unit 11 also has associated with it an identifier unit 522 that stores an identifier or identifiers assigned to the (currently enabled) access window for that graphics processing unit. The identifier is provided by the management circuit 12 via an identifier interface 524 for the graphics processing unit. The graphics processing unit can then, e.g., output the identifier together with the output data from the L2 cache 504. The identifier can be used for memory access permission checking, e.g. a virtual machine and/or graphics processing unit may not be able to access data associated with another virtual machine and/or graphics processing unit because it does not know the correct identifier for accessing that data.

FIG. 11 shows an overview of the graphics processing units according to embodiments of the technology described herein. However, it should again be noted that FIG. 11 is only schematic and that various components and connections have been omitted from that Figure for the sake of clarity.

Equally, the data processing system and/or graphics processing unit(s) of the present embodiments may include, as appropriate, one or more of the features described in US 2017/0236244, the entire contents of which is incorporated herein by reference, and/or US 2019/0056955, the entire contents of which is incorporated herein by reference.

As will be appreciated from the above, in these embodiments of the technology described herein, the graphics processing units and their associated management circuit can, in effect, be considered to be divided into three different "safety" domains, a "control" safety domain 50, comprising the main configuration control of the management circuit 12, that is owned and controlled by the "safety island" CPU cluster 6, and then two further domains, comprising a "safety critical" domain 51 that comprises a group of graphics processing resources being used by and owned by the "safety critical" ASIL CPU cluster 4, and a second, "non-safety critical" domain 52 comprising a group of graphics processing units, etc., that is to be used, and owned by the QM CPU cluster 2.

Figure 12:
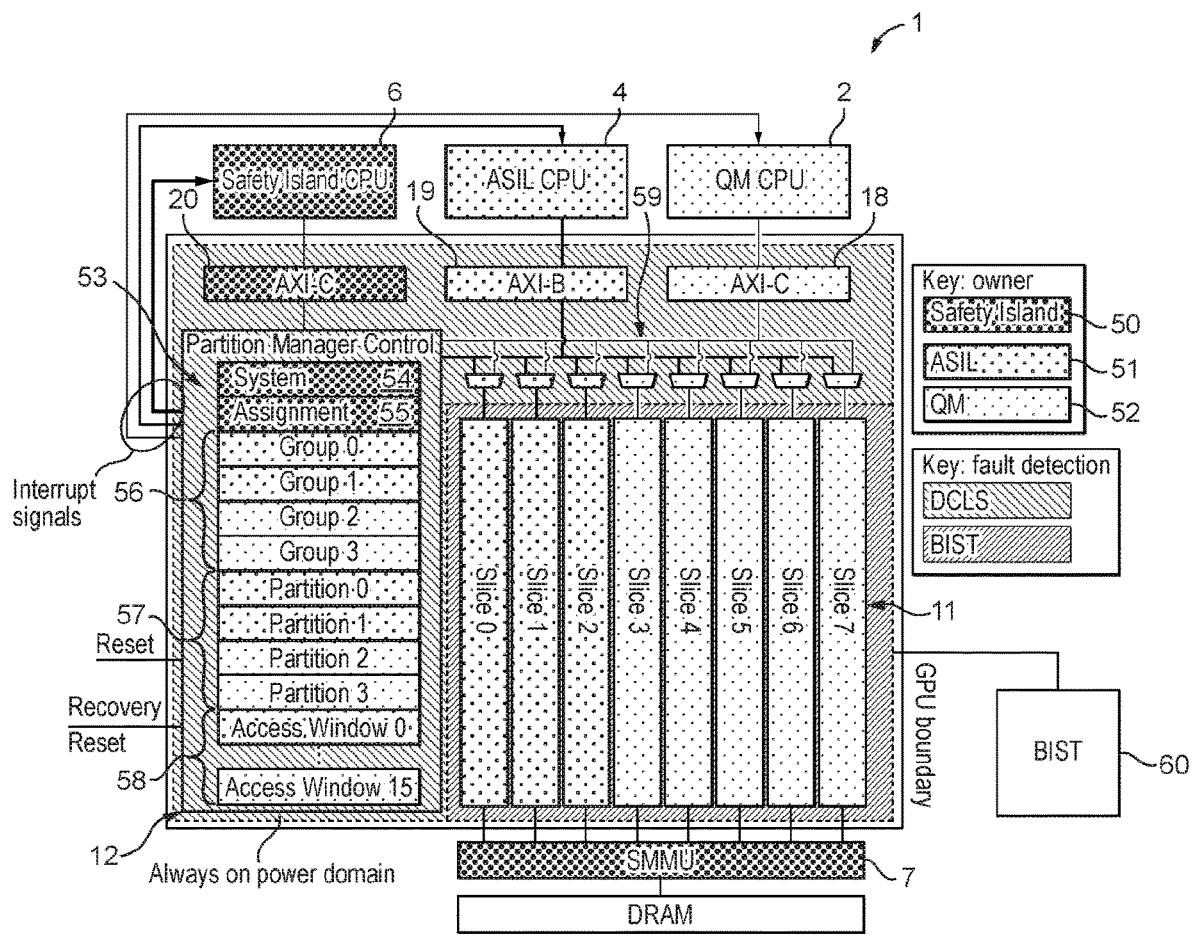
FIG. 12 shows schematically further details of an embodiment of the technology described herein.

FIG. 12 illustrates this and shows in more detail the arrangement of the management circuit and the distribution of the "ownership" of different aspects of the management circuit and the graphics processing units between the different domains.

As shown in FIG. 12, the management circuit (partition manager) 12 includes, inter alia, a set of control interfaces (communications interfaces) 53 that may be used to control the management circuit to configure the groups of graphics processing resources, and then to use the resources in the groups. These control (communications) interfaces comprise respective address spaces and sets of registers that can be addressed by appropriate software executing on the processors (processor clusters).

These control interfaces comprise firstly a "system" interface 54 that comprises a set of control registers that may be used, for example, to set system parameters, such as the stream IDs to be used for respective access windows.

The system interface 54 may also be used (by the controller 30) to configure the fault protection and detection settings (operation), such as enabling the desired fault detection mechanisms (and their interrupts), enabling fault detection for the desired groups, partitions and graphics processing units, and/or configuring the behaviour in the event of a fault (e.g. whether fault reporting is enabled or disabled, the current operation should be terminated or continued, etc.).

There is then an "assignment" interface 55, which is used by the controller on the safety island CPU cluster 6 to set the allocation of resources (so graphics processing units (slices), partitions and access windows) to the respective groups, and the allocation of the groups to the respective communications buses.

As shown in FIG. 12, these interfaces 54, 55 of the management circuit are used by and belong to the controller 30 on the safety island processor cluster 6, and are accessed via (and only accessible via) the corresponding privileged bus 20 for communicating with the safety island CPU cluster 6.

The management circuit 12 then further includes a set of "group" configuration interfaces 56, which can be used by the arbiters for the respective groups to configure the resources within the group, and in particular to configure and set up the allocation of graphics processing units and access windows to respective partitions within the groups.

As shown in FIG. 12, these group configuration interfaces are accessible to and will be accessed by the respective arbiters to which the groups have been assigned, via the corresponding communications bus for the processor cluster that the arbiter is executing on.

In the example shown in FIG. 12, it is assumed that groups 0 and 1, partitions 0 and 1, graphics processing units (slices) 0-2 and an appropriate set of access windows have been assigned to the ASIL CPU cluster 4, and so will be controlled by the corresponding arbiter 32 for that cluster via the ASIL cluster communications bus 19.

Correspondingly, groups 2-3, partitions 2-3, graphics processing units 3-7 and a suitable set of access windows have been assigned to the QM cluster 2, and so will be controlled by the arbiter 31 for that cluster over the QM cluster bus 20.

Other distributions of the resources into groups (and thus as between the CPU clusters) could be used if desired.

As well as the group configuration interfaces 56, the management circuit also provides a set of partition control interfaces 57, which may be used by the arbiter for the group of graphics processing units that the partition belongs to, inter alia, power a partition on and off, reset the partition, and, also, and as will be discussed further below, trigger fault detection testing for the partition in question.

The management circuit 12 then finally provides, as discussed above, a set of access windows 58, to provide the communication and control interface whereby a virtual machine may access and control a partition of a group of graphics processing units that it has been allowed access to. As discussed above, the access windows also provide an appropriate message passing interface for communications between the arbiter and the virtual machine that the access window belongs to.

FIG. 12 also shows the configurable communications network 59 of the management circuit that, as discussed above, can be set under the control of the controller on the safety island 6 to configure the graphics processing units into the respective groups, and to be coupled to the appropriate one of the communication buses 19, 20, etc.

The management circuit is connected to, as discussed above, three separate communications buses that can be used to communicate with the management circuit and the graphics processing units, namely a privilege-restricted bus 20 for communicating with the safety island CPU cluster 6, a bus 19 for communicating with ASIL CPU cluster 4 and a bus 20 for communicating with the QM CPU cluster 2.

In order to further support and facilitate separation between the hardware of different groups of graphics processing units (and thus the different domains), the management circuit 12 is able to power respective partitions of graphics processing units, and individual graphics processing units within a partition of graphics processing units, on and off independently of each other, and, correspondingly, can reset a partition of graphics processing units (and individual graphics processing units within a partition), independently of each other. This is done under the control of the arbiter for the group of graphics processing units in question, via the corresponding partition interface 57.

On the other hand, as shown in FIG. 12, the management circuit itself is always powered on (and may only be powered off under the control of the system controller 30 on the safety island CPU 6). Correspondingly, the management circuit can only be reset by the system controller 30 on the safety island CPU 6. As shown in FIG. 12, in this embodiment there are two levels of "reset" that can be applied to the management circuit, a first "reset" that resets all hardware, and a second "recovery reset" that resets all hardware except for error reporting mechanisms (which may, e.g., be used when error recovery requires a reset (e.g. because a unit is unresponsive)).

Also, as shown in FIG. 12, each CPU cluster has its own, independent interrupt. In this embodiment, both the management circuit, and each partition of graphics processing units, can generate its own, independent interrupt. The interrupts are broadcast to all of the CPU clusters of the system, with the corresponding interrupt controller for each CPU cluster identifying whether the broadcast interrupt applies to it or not (is for a partition of a group of graphics units that is under its ownership in the case of the ASIL CPU cluster 4 and the QM CPU cluster 2, or is from the management circuit in the case of the safety island CPU cluster 6).

In the present embodiments, in order to further support the operation of the groups of graphics processing units in separate, "safety critical" and "non-safety critical" domains, and under the control of a "safety island" domain, the system further supports and uses appropriate fault protection mechanisms for the management circuit 12 and the graphics processing units 11.

In particular, the management circuit is permanently operated at a higher (high) level of fault protection, in this embodiment by being always and permanently subjected to a fault detection process (monitoring). This is achieved in the present embodiment by protecting the management circuit using a dual core lockstep fault detection mechanism, i.e. the management circuit is instanced twice, with one instance of the management circuit being used to check the operation of the other instance of the management circuit at all times (and such that if there is any discrepancy between them, that will be taken as indicating a fault).

The graphics processing units, on the other hand, are not protected by dual-core lockstep, but are instead able to be protected against faults using a fault detection testing process, which in this embodiment comprises built-in self-testing (BIST). In the present embodiments, and as will be discussed further below, this built-in self-testing can be selectively triggered for a graphics processing unit, under the control of the arbiter for the group of graphics processing units that the graphics processing unit belongs to. In particular, as discussed above, the arbiter can use the partition control interfaces 57 to trigger BIST fault detection testing for a partition.

This then allows the graphics processing units (and in particular respective groups of the graphics processing units) to be protected at either a higher or lower level of fault protection (i.e. either to be subject to BIST in use or not)).

In the present embodiments, BIST is used for a group of graphics processing units in dependence upon whether the group of graphics processing units is operating as part of the "safety" domain for the ASIL CPU cluster 4, or a "non-safety critical" domain for the QM CPU cluster 2.

Thus, when a graphics processing unit is part of a group that is to be used for the "safety critical" domain (ASIL CPU cluster 4), built-in self-testing is performed for the graphics processing unit, but when a graphics processing unit is part of a group that is to be used for the non-safety critical domain (i.e. to be used by the QM CPU cluster 2 in the present embodiments), then built-in self-testing is not performed for the graphics processing unit.

In this way, the groups of graphics processing units can be respectively configured as higher fault protection or lower fault protection groups of graphics processing units, and without the need to permanently protect the graphics processing units with the higher level of fault protection.

In order to facilitate this operation, the arbiter 32 for the ASIL CPU cluster 4 is configured to automatically and always cause built-in self-testing to be performed for any group of graphics processing units that it is allocated. Correspondingly, the arbiter 31 for the QM CPU cluster 2 is configured to not perform built-in self-testing for any group of graphics processing units that it is allocated. Thus the allocation of the groups of graphics processing units to the respective CPU clusters and their arbiters by the controller 30 correspondingly sets and configures whether the group of graphics processing units will be subjected to the higher level of fault protection provided by BIST or not.

It will correspondingly be understood that when a graphics processing unit is moved between domains (e.g. as illustrated in FIG. 8) it may correspondingly become subject to built-in self-testing (or no longer be subject to built-in self-testing), as appropriate.

As shown in FIG. 12, in order to support the use of BIST fault detection testing for the graphics processing units, the data processing system further comprises an appropriately configured BIST unit (circuit) 60. Thus when the arbiter for a group of graphics processing units indicates that a graphics processing unit should undergo a built-in self-test, that test will be performed appropriately for the graphics processing unit in question by the BIST unit.

Once the groups of graphics processing units have been configured, and allocated to respective arbiters, etc., then the group of graphics processing units for the QM CPU cluster 2 (and thus that is to be operated at the lower level of fault protection) will be operated without BIST being performed for the group of graphics processing units.

On the other hand, BIST will be performed for the group of graphics processing units that is allocated to the ASIL CPU cluster 4 (and thus is to be operated with a higher level of fault protection).

As discussed above, in the present embodiment, the arbiter 32 for the group of graphics processing units for the ASIL CPU cluster 4 will control the BIST fault detection testing of the group of graphics processing units, via the partition control interfaces 57 of the management circuit that can be set by the arbiter to trigger the fault detection testing for a partition of the graphics processing units.

Thus the arbiter 32 is able to and operates to cause respective partitions of the group of graphics processing units to be subjected to the BIST fault detection testing (can and does trigger the BIST fault detection testing for the partitions graphics processing units in its group on a partition-by-partition basis, with each partition being tested independently of the other partitions).

In the present embodiment, each graphics processing unit can be, and is, subjected to the BIST fault detection testing on its own, and independently of any other graphics processing units of the partition.

Thus when a partition is tested, each graphics processing unit of the partition is tested separately.

Furthermore, the testing is done such that each of the graphics processing units in the group is (fully) tested at least once within a desired (fault detection) testing interval (diagnostic test interval) for the graphics processing unit in question (as may be specified for the data processing system and "safety critical" domain, in question).

The testing is then repeated at appropriate intervals, to ensure compliance with the required diagnostic test interval(s).

When BIST testing a partition, the partition is removed from being accessed by any virtual machine, then tested, and then returned to being available for use by virtual machines for processing operations (assuming that the testing is passed).

Figure 13:
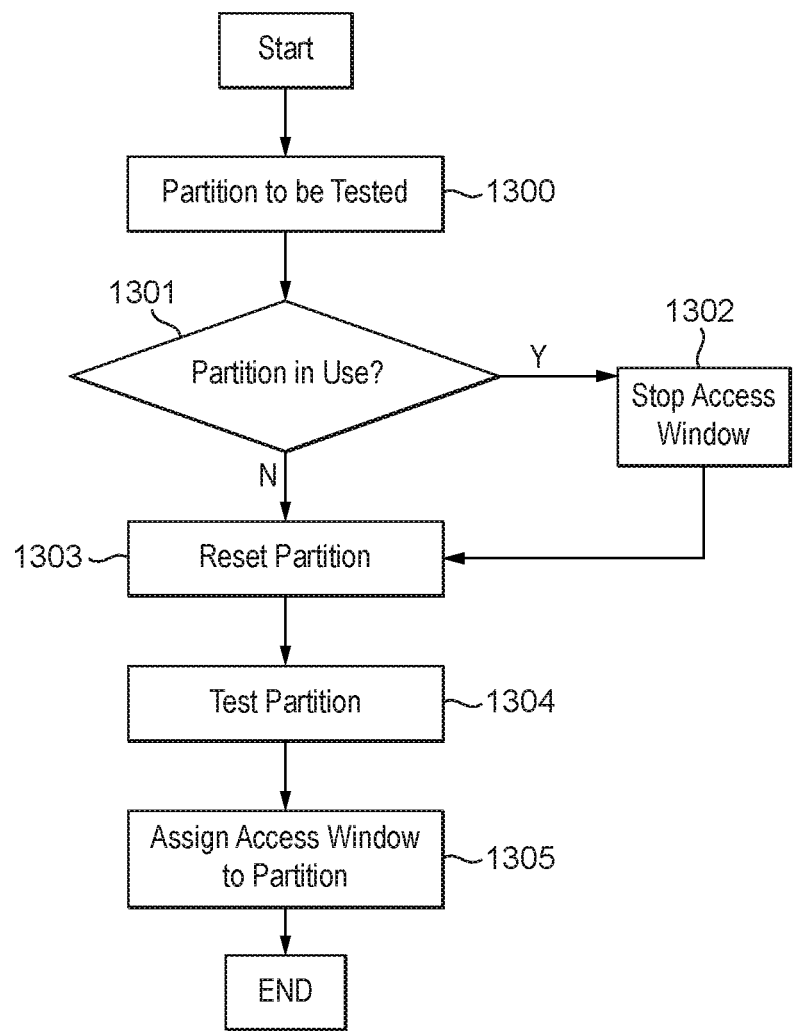
FIG. 13 shows the operation of an arbiter when fault detection testing a group of processing units.

FIG. 13 illustrates this, and shows the operation of the arbiter 32 for the ASIL CPU cluster 4 when performing BIST fault detection testing of a partition of the group of graphics processing units that it has been allocated.

As shown in FIG. 13, for a partition to be tested (step 1300), it will first be determined whether the partition is in use for a virtual machine (step 1301). If so, the virtual machine process will be appropriately suspended and its access window to the partition will be appropriate disabled (step 1302).

Then, in either case, the partition will be appropriately reset (step 1303).

The arbiter will then trigger the appropriate BIST testing of the partition (step 1304). As discussed above, this will be done by triggering and performing BIST testing for each graphics processing unit of the partition separately. Each graphics processing unit of the partition will be tested independently, but they can all be tested at the same time or at different times (e.g. in turn), as desired.

Once the BIST testing has been completed (and assuming that the test was passed (e.g. no errors were detected)), then the partition is re-enabled for use, by assigning an access window to it (step 1305).

The process is done (repeatedly) for each partition such that, as discussed above, all of the partitions are repeatedly tested within a required diagnostic test interval.

As discussed above, if the BIST testing is passed by a partition, then the partition is re-enabled for use. On the other hand, if a partition fails the BIST testing, then an (appropriate) fault detection event action is performed. This may be done, e.g., by the management circuit, and/or by the BIST circuit (unit), and could comprise, for example, performing some form of error recovery operation and/or reporting the fault to another component of the system, such as the controller, for handling. In the event of a fault, the graphics processing unit and/or partition may, e.g., be reset, and/or may enter a particular, e.g. pre-set "safe" mode of operation. As discussed above, the operation in the event of the BIST testing being failed may be configured by the management circuit, e.g. under the control of the controller.

(Correspondingly, if the dual core lock step fault detection monitoring of the management circuit should detect a fault, then again an appropriate fault detection event action is in an embodiment performed, such as the management circuit performing some form of error recovery operation, and/or reporting the fault to another component of the system, such as the controller, for handling. For example, in the event of a fault, some or all of the system may, e.g. be reset, and/or the system may enter a particular, e.g. pre-set, "safe" mode of operation.)

Although the present embodiments have been described above with particular reference to the use of graphics processing units (with the processing units being graphics processing units), as discussed, the present embodiments are equally applicable for any desired form of processing unit, such as video processing units, machine learning accelerators (processing units), etc.

It can be seen from the above that the technology described herein, in its embodiments at least, provides a system in which, in effect, a pool of processing resources can be flexibly and adaptively organised into different groups of those resources, to permit different groups of virtual machines to use the processing resources, whilst still being able to maintain appropriate and secure separation (isolation) between, e.g., a functional safety (safety critical) domain and a non-functional safety (non-safety critical) domain.

This is achieved, in the embodiments of the technology described herein at least, by providing both a (privileged) controller that is able to configure the groups of processing resources in a secure manner, and respective arbiters that are then able to control the access by virtual machines to processing resources within the respective groups. The controller and arbiters can operate to configure and change the distribution of processing resources within the groups and between the groups in an appropriately secure manner, and to allow the resources to be shared between different virtual machines as desired.

This is further facilitated, in the embodiments of the technology described herein at least, by, inter alia: assigning processing resources to different, and independent, communications paths (buses); assigning different identifiers to transactions issued by bus masters (which can then be used to restrict access to data in memory; and, e.g., can be used to indicate quality of service requirements); providing independent interrupts for routing to the different domains; providing independent resets for hardware resources that may be in (that can be moved between) different domains; providing independent power controls for hardware resources that may be in (that can be moved between) different domains; and providing independent, and selectively applyable, fault detection testing for hardware resources that may be in (that can be moved between) different domains.

The foregoing detailed description has been presented for the purposes of illustration and description. It is not intended to be exhaustive or to limit the technology described herein to the precise form disclosed. Many modifications and variations are possible in the light of the above teaching. The described embodiments were chosen in order to best explain the principles of the technology described herein and its practical applications, to thereby enable others skilled in the art to best utilise the technology described herein, in various embodiments and with various modifications as are suited to the particular use contemplated. It is intended that the scope be defined by the claims appended hereto.

The invention claimed is:

1. A data processing system comprising:
a plurality of processing units;
a controller operable to allocate processing units of the plurality of processing units into respective groups of the processing units, wherein each group of processing units comprises a set of one or more of the processing units of the plurality of processing units;
the data processing system further comprising:
one or more processors that execute a plurality of arbiters, each arbiter being operable to control access by virtual machines that require processing operations to the processing units of a group of processing units that the arbiter has been allocated;
wherein
the arbiter for a group of the processing units is only able to allow a virtual machine to access processing units from within the group of processing units that it has been allocated.

2. The system of claim 1, wherein the controller executes on one processor of the system, and the arbiters and the virtual machines execute on a different processor or processors to the controller.

3. The system of claim 1, further comprising:
a management circuit associated with the processing units and that is operable to configure the processing units into different groups under the control of the controller;
wherein
the controller is configured to communicate with the management circuit over a communications bus that is not accessible to any of the virtual machines that may require processing by the processing units, nor to the arbiters for the groups of processing units.

4. The system of claim 1, wherein
the processing units of a group of processing units are themselves able to be configured as respective partitions of processing units within the group, with each partition being able to be independently allocated to a virtual machine, and comprising a subset of one or more of the processing units of the group; and
the controller is operable to set for a group of processing units that it allocates, how many partitions of processing units the group supports;
wherein the arbiter for a group of processing units is operable to configure the processing units of the group into the set number of partitions of processing units for the group.

5. The system of claim 1, wherein the controller is also operable to allocate to a group of processing units, one or more access windows that provide the mechanism by which virtual machines can access processing units of the group.

6. The system of claim 1, wherein
the processing units of a group of processing units are themselves able to be configured as respective partitions of processing units within the group, with each partition being able to be independently allocated to a virtual machine, and comprising a subset of one or more of the processing units of the group; and
the arbiter for a group of processing units is operable to control access by virtual machines that require processing operations to the processing units of its group of processing units by enabling an access window that provides the mechanism by which a virtual machine can access processing units of the group associated with a virtual machine for access to a partition of the processing units of the group.

7. The system of claim 1, comprising:
a first processor cluster that is configured to operate in a safety critical manner and that executes a safety-critical arbiter and a group of one or more safety critical virtual machines, and that communicates with the processing units via a first communications bus; and
a second processor cluster that is other than configured to operate in a safety-critical manner, and that executes a non-safety-critical arbiter and a group of one or more non-safety-critical virtual machines, and that communicates with the processing units via a second, different communications bus.

8. The system of claim 1, further comprising:
a management circuit associated with the processing units and operable to configure the processing units of the plurality of processing units into respective groups of the processing units under the control of the controller;
and wherein:
the management circuit is configured to operate with a higher level of fault protection at all times; and
the groups of the processing units can be selectively operated with either of at least two modes of fault protection, where one mode provides a higher level of fault protection than the other mode.

9. The system of claim 8, further comprising a fault detection testing mechanism that may be selectively performed for a group of processing units, whereby the groups of the processing units can be selectively operated with either a higher level of fault protection or a lower level of fault protection.

10. The system of claim 9, wherein the fault detection testing for a group of processing units is performed under the control of an arbiter for the group of processing units.

11. The system of claim 10, wherein respective arbiters of the system are configured either to perform or to not perform fault detection testing for a group of processing units that they have been allocated.

12. A method of operating a data processing system, the data processing system comprising a plurality of processing units, and one or more processors;
the method comprising:
a controller allocating processing units of the plurality of processing units into respective groups of the processing units, wherein each group of processing units comprises a set of one or more of the processing units of the plurality of processing units;

and, for each group of processing units:

an arbiter associated with that group of processing units, the arbiter executing on one of the processors, controlling access by a virtual machine or machines that requires processing operations to processing units from and solely from the group of processing units.

13. The method of claim 12, wherein the system comprises a management circuit associated with the processing units and that is operable to configure the processing units into different groups under the control of the controller; and the controller communicates with the management circuit over a communications bus that is not accessible to any of the virtual machines that may require processing by the processing units, nor to the arbiters for the groups of processing units.

14. The method of claim 12, wherein the processing units of a group of processing units are themselves able to be configured as respective partitions of processing units within the group, with each partition being able to be independently allocated to a virtual machine, and comprising a subset of one or more of the processing units of the group; and the method comprises:

the controller setting for a group of processing units that it allocates, how many partitions of processing units the group supports; and the arbiter for a group of processing units configuring the processing units of the group into the set number of partitions of processing units for the group.

15. The method of claim 12, comprising the controller allocating to each group of processing units, one or more access windows that provide the mechanism by which virtual machines can access processing units of the group.

16. The method of claim 12, wherein the processing units of a group of processing units are themselves able to be configured as respective partitions of processing units within the group, with each partition being able to be independently allocated to a virtual machine, and comprising a subset of one or more of the processing units of the group; and the method comprises:

the arbiter for a group of processing units controlling access by a virtual machine to the processing units of its group of processing units by enabling an access window that provides the mechanism by which a virtual machine can access processing units of the group associated with the virtual machine for access to a partition of the processing units of the group.

17. The method of claim 12, wherein the data processing system comprises:

a first processor cluster that is configured to operate in a safety critical manner and that executes a safety-critical arbiter and a group of one or more safety critical virtual machines, and that communicates with the processing units via a first communications bus; and a second processor cluster that is other than configured to operate in a safety-critical manner, and that executes a non-safety-critical arbiter and a group of one or more non-safety-critical virtual machines, and that communicates with the processing units via a second, different communications bus; and the method comprises:

the controller allocating the plural processing units into two different groups of the processing units; and assigning one group to the first communications bus and one group to the second communications bus.

18. The method of claim 12, wherein the system comprises a management circuit associated with the processing units and operable to configure the processing units of the plurality of processing units into respective groups of the processing units under the control of the controller;

and the method comprises:

operating the management circuit with a higher level of fault protection at all times, but selectively operating the groups of the processing units with either of at least two modes of fault protection, where one mode provides a higher level of fault protection than the other mode.

19. The method of claim 18, wherein:

the system comprises a plurality of arbiters, and respective arbiters of the system are configured either to perform or to not perform fault detection testing for a group of processing units that they have been allocated;

and the controller configures a group of processing units to be operated at a higher level of fault protection by assigning it to an arbiter that performs the fault detection testing, and configures a group of processing units to be operated with a lower level of fault protection by assigning it to an arbiter that does not perform the fault detection testing.

20. A non-transitory computer readable storage medium storing computer software code which when executing on one or more processors performs a method of operating a data processing system, the data processing system comprising a plurality of processing units, and one or more processors;

the method comprising:

a controller allocating processing units of the plurality of processing units into respective groups of the processing units, wherein each group of processing units comprises a set of one or more of the processing units of the plurality of processing units;

and, for each group of processing units:

an arbiter associated with that group of processing units, the arbiter executing on one of the processors, controlling access by a virtual machine or machines that requires processing operations to processing units from and solely from the group of processing units.

* * * * *